US012592021B2

(12) United States Patent
Uhrenholt et al.

(10) Patent No.: US 12,592,021 B2
(45) Date of Patent: Mar. 31, 2026

(54) GRAPHICS PROCESSING

(71) Applicant: Arm Limited, Cambridge (GB)

(72) Inventors: Olof Henrik Uhrenholt, Lomma (SE); Jakob Axel Fries, Lund (SE)

(73) Assignee: Arm Limited, Cambridge (GB)

( * ) Notice: Subject to any disclaimer, the term of this patent is extended or adjusted under 35 U.S.C. 154(b) by 285 days.

(21) Appl. No.: 18/483,972

(22) Filed: Oct. 10, 2023

(65) Prior Publication Data

US 2025/0111577 A1 Apr. 3, 2025

Related U.S. Application Data

(63) Continuation-in-part of application No. 18/478,078, filed on Sep. 29, 2023, and a continuation-in-part of application No. 18/478,131, filed on Sep. 29, 2023, now Pat. No. 12,450,681, and a continuation-in-part of application No. 18/478,121, filed on Sep. 29, 2023, and a continuation-in-part of application No. 18/478,657, filed on Sep. 29, 2023.

(51) Int. Cl.
*G06T 15/00* (2011.01)

(52) U.S. Cl.
CPC .................................. *G06T 15/005* (2013.01)

(58) Field of Classification Search
CPC . G06T 15/005; G06T 1/20; G06T 1/60; G06F 2209/501; G06F 9/4843
See application file for complete search history.

(56) References Cited

U.S. PATENT DOCUMENTS

| | | | | |
|---|---|---|---|---|
| 7,023,437 | B1 | 4/2006 | Voorhies et al. | |
| 11,127,188 | B1 | 9/2021 | Uhrenholt | |
| 11,132,835 | B1 | 9/2021 | Uhrenholt | |
| 11,256,720 | B1 | 2/2022 | Hoffman | |
| 2003/0225898 | A1 | 12/2003 | Saika | |
| 2005/0195197 | A1 | 9/2005 | Wolfe | |
| 2012/0304194 | A1* | 11/2012 | Engh-Halstevdt | G06T 1/20 718/106 |

(Continued)

FOREIGN PATENT DOCUMENTS

GB 2595025 A 11/2021

OTHER PUBLICATIONS

U.S. Appl. No. 18/478,121, filed Sep. 29, 2023, "Graphics Processing".

(Continued)

*Primary Examiner* — Devona E Faulk
*Assistant Examiner* — Donna J. Ricks
(74) *Attorney, Agent, or Firm* — Pearl Cohen Zedek Latzer Baratz LLP

(57) ABSTRACT

A method of operating a graphics processor when performing a certain sequence of rendering jobs that produces a series of progressively lower resolution versions of the same render output comprising issuing rendering tasks for different rendering jobs concurrently and controlling processing for a later rendering job using a respective 'task completion status' data structure associated with the earlier rendering job on which it depends, wherein the looking up of respective entries in the 'task completion status' data structure takes into account the change in resolution between the first, earlier rendering job and the second, later rendering job.

17 Claims, 15 Drawing Sheets

(56) References Cited

U.S. PATENT DOCUMENTS

| | | | | |
|---|---|---|---|---|
| 2015/0032969 | A1 | 1/2015 | Bratt | |
| 2015/0220341 | A1 | 8/2015 | Ohannessian, Jr | |
| 2016/0239939 | A1 | 8/2016 | Kakarlapudi | |
| 2017/0148204 | A1 | 5/2017 | Hakura et al. | |
| 2017/0212764 | A1 | 7/2017 | Lyberis | |
| 2017/0316601 | A1* | 11/2017 | Kakarlapudi | G06T 19/20 |
| 2018/0158168 | A1 | 6/2018 | Foo | |
| 2018/0165788 | A1 | 6/2018 | Balci | |
| 2019/0088009 | A1 | 3/2019 | Forey et al. | |
| 2020/0111247 | A1 | 4/2020 | Heggelund | |
| 2020/0379909 | A1 | 12/2020 | Uhrenholt | |
| 2021/0192672 | A1* | 6/2021 | Mccrary | G06F 9/3838 |
| 2022/0020108 | A1 | 1/2022 | Uhrenholt | |
| 2022/0101479 | A1 | 3/2022 | Alla et al. | |
| 2024/0320896 | A1 | 9/2024 | Ma | |

OTHER PUBLICATIONS

U.S. Appl. No. 18/478,131, filed Sep. 29, 2023, "Graphics Processing".
U.S. Appl. No. 18/478,078, filed Sep. 29, 2023, "Graphics Processing".
U.S. Appl. No. 18/478,657, filed Sep. 29, 2023, "Graphics Processing".
Combined Search and Examination Report under Sections 17 and 18(3), dated Feb. 4, 2025, GB Application No. GB2414257.2, 5 pages.
U.S. Appl. No. 18/894,496, filed Sep. 24, 2024, "Graphics Processing".
Non-final Office Action dated Jul. 9, 2025, U.S. Appl. No. 18/478,131 filed Sep. 29, 2023.
Non-final Office Action dated Jun. 9, 2025, U.S. Appl. No. 18/478,657, filed Sep. 29, 2023.
Response to Office Action dated Jun. 18, 2025, U.S. Appl. No. 18/478,657, filed Sep. 29, 2023.
Non-final Office Action dated May 19, 2025, U.S. Appl. No. 18/478,078, filed Sep. 29, 2023.
Combined Search and Examination Report under Sections 17 and 18(3), dated Mar. 26, 2024, GB Patent Application No. GB2315009.7.
Non-final Office Action dated Aug. 18, 2025, U.S. Appl. No. 18/478,121, filed Sep. 29, 2023.
Final Office Action dated Aug. 19, 2025, U.S. Appl. No. 18/478,657, filed Sep. 29, 2023.
Response to Office Action dated Aug. 26, 2025, U.S. Appl. No. 18/478,131 filed Sep. 29, 2023.
Notice of Allowance dated Sep. 18, 2025, U.S. Appl. No. 18/478,131 filed Sep. 29, 2023.
Response to Office Action dated Sep. 19, 2025, U.S. Appl. No. 18/478,078, filed Sep. 29, 2023.
Final Office Action dated Sep. 30, 2025, U.S. Appl. No. 18/478,078, filed Sep. 29, 2023.
Response to Office Action dated Dec. 17, 2025, U.S. Appl. No. 18/478,657, filed Sep. 29, 2023.
Response to Office Action dated Dec. 18, 2025, U.S. Appl. No. 18/478,121, filed Sep. 29, 2023.
Response to Office Action dated Dec. 29, 2025, U.S. Appl. No. 18/478,078, filed Sep. 29, 2023.

* cited by examiner

GRAPHICS PROCESSING

BACKGROUND

The technology described herein relates to performing graphics processing, and in particular to the operation of graphics processors when performing a sequence of rendering jobs, e.g. to generate one or more outputs, e.g. frames, e.g. for display.

Graphics processing is normally carried out by first dividing the graphics processing (render) output to be rendered, such as a frame to be displayed, into a number of similar basic components of geometry to allow the graphics processing operations to be more easily carried out. These basic components of geometry may often be referred to graphics "primitives", and such "primitives" are usually in the form of simple polygons, such as triangles, points, lines, etc. (or groups thereof).

Each primitive (e.g. polygon) is at this stage defined by and represented as a set of vertices. Each vertex for a primitive has associated with it a set of data (such as position, colour, texture and other attributes data) representing the vertex. This "vertex data" is then used, e.g., when rasterising and rendering the primitive(s) to which the vertex relates in order to generate the desired render output of the graphics processing system.

For a given output, e.g. frame to be displayed, to be generated by the graphics processing system, there will typically be a set of vertices defined for the output in question. The primitives to be processed for the output will then be indicated as comprising given vertices in the set of vertices for the graphics processing output being generated. Typically, the overall output, e.g. frame to be generated, will be divided into smaller units of processing, referred to as "draw calls". Each draw call will have a respective set of vertices defined for it and respective primitives that use those vertices. For a given frame, there may, e.g., be of the order of a few thousand draw calls, and hundreds of thousands (or potentially millions) of primitives.

Once primitives and their vertices have been generated and defined, they can be processed by the graphics processor, in order to generate the desired graphics processing output (render target), such as a frame for display. This basically involves determining which sampling positions of an array of sampling positions associated with the render output area to be processed are covered by a primitive, and then determining the appearance each sampling position should have (e.g. in terms of its colour, etc.) to represent the primitive at that sampling position. These processes are commonly referred to as rasterising and rendering, respectively. (The term "rasterisation" is sometimes used to mean both primitive conversion to sample positions and rendering. However, herein "rasterisation" will be used to refer to converting primitive data to sampling position addresses only.)

(It will be appreciated that rasterisation-based rendering as described above is merely one approach for producing a render output and other types of rendering operation exist that may be implemented by a graphics processor including, for example, ray tracing or hybrid ray tracing rendering operations.)

One form of graphics processing uses so-called "tile-based" rendering. In tile-based rendering, the two-dimensional render output (i.e. the output of the rendering process, which may be an output frame to be displayed but could be an "intermediate" output or other suitable render target, as will be explained further below) is rendered as a plurality of smaller area regions, usually referred to as rendering "tiles", which rendering tiles can then be (and are) rendered separately. The rendered tiles are then recombined to provide the complete render output, e.g. frame, e.g. for display.

In such arrangements, the render output, e.g. frame to be displayed, is typically divided (by area) into regularly-sized and shaped rendering tiles (they are usually e.g., squares or rectangles), but this is not essential and other arrangements are possible.

(Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques wherein the render output is rendered as a plurality of smaller area regions.)

Modern graphics processors typically include one or more processing (shader) cores, that execute, inter alia, programmable processing stages, commonly referred to as "shaders", of a graphics processing pipeline that the graphics processor implements.

A graphics processor processing (shader) core is thus a processing unit that performs processing by running (typically small) programs for each "work item" in an output to be generated. In the case of generating a graphics output, such as a render target, such as a frame to be displayed, a "work item" in this regard may be a sampling position, e.g., in the case of a fragment shader, but could also be a vertex, or a ray, for example, depending on the graphics processing (shading) operation in question. In the case of compute shading operations, each "work item" in the output being generated will be, for example, the data instance (item) in the work "space" that the compute shading operation is being performed on.

In order to execute shader programs, a graphics processor will include an appropriate execution unit or units (circuit or circuits) for that purpose. The execution unit(s) will include programmable processing circuit(s) for executing shader programs (the "shaders" of graphics processing pipeline).

The actual data processing operations that are performed by the execution unit when executing that shader program are usually performed by respective functional units of the execution unit, which may include (but are not limited to) a texture mapping unit that is configured to perform certain texturing operations. Thus, the functional units will in response to and as required by instructions in a (shader) program being executed perform appropriate data processing operations.

In addition to the programmable execution unit that executes the shader programs (using its associated functional units) the graphics processor processing (shader) core may typically also include one or more essentially fixed-function (hardware) stages for implementing certain stages of the graphics processing (rendering) pipeline. These fixed-function stages can be used to handle certain fragment "frontend" processing operations for setting-up the fragment shader program (which may include, for example, primitive list reading, resource allocation, vertex fetching, rasterisation, early depth/stencil testing, but various arrangements would be possible, e.g. depending on the particular configuration of the graphics processing pipeline) and also certain post-shader actions, such as late depth/stencil testing or tile write-out.

Thus, the graphics processor processing (shader) core is operable and configured to implement an instance of the graphics processing pipeline for processing a given rendering task with the processing (shader) core operable and configured to load the required data for setting up the shader program and then executing the desired fragment shader program to perform the actual rendering operation. The output of the rendering task is then written out accordingly.

Typically there may be many parallel processing (shader) cores within a graphics processor such that the graphics processor is capable of simultaneously processing plural different rendering tasks in parallel. Thus, in a tile-based rendering system, respective tasks for processing different tiles may be issued to different processing (shader) cores such that the tiles can be rendered in parallel. This can therefore provide a more efficient graphics processor operation.

Thus, when the graphics processor receives a command to generate a particular render target, i.e. by performing a render pass whose output is the desired render target (and which render pass may generally comprise one or more rendering jobs, each rendering job comprising a respective set of rendering tasks to be processed for the desired render target), the command is then processed within a suitable command processing unit (e.g. a command stream frontend/job manager) of the graphics processor to identify the rendering jobs to be performed, and a suitable (fragment) task iterator then schedules the processing of the respective sets of rendering tasks to be performed for the rendering jobs for the render pass accordingly, with the rendering tasks being allocated to the available processing (shader) cores for processing.

Although described above in relation to a single render pass, it will be appreciated that multiple render passes may generally be performed as part of generating a single output, e.g. a single frame, e.g. for display.

For example, a given rendering job within a render pass may generate a "final" output, e.g. a frame, e.g. for display. However, in general, there may be multiple rendering jobs and multiple render passes that are performed in order to generate a given final output (frame). Thus, a given rendering job (within a given render pass) may, e.g., generate an "intermediate" output, such as a "render to texture" output (i.e. a texture), that is then used by a subsequent rendering job (e.g., within the next render pass, although it could also be used by another rendering job within the same render pass) when generating the final output, e.g. frame. This can provide a more efficient graphics processor operation, e.g. compared to simply generating the final output (frame) in full by a single rendering job (render pass).

Similarly, it will be appreciated that most graphics processing applications do not require only a single output, e.g. frame, to be generated in isolation, but rather will typically require a sequence of outputs, e.g. frames, to be generated, e.g. for a continued display.

The graphics processor when generating one or more frames may thus generally be operable and configured to perform a sequence of render passes, with each render pass comprising one or more rendering jobs for generating a respective (overall) output for that render pass. The different render passes in a sequence of render passes being performed may in some cases be independent of each other (e.g. where they relate to different frames, or exclusively write to different (data buffers). However, it is also often the case that at least some of the different render passes in a sequence of render passes being performed are related to each other. For example, this may be the case when one render pass generates a "render to texture" or other suitable "intermediate" output that is then consumed by the next render pass. There may also be dependencies between rendering jobs within a particular render pass, e.g. where a "compute" job performs calculations based on a render output produced by a preceding fragment job.

Thus, in a given sequence of rendering jobs to be performed, there may be certain data (processing) dependencies between rendering jobs that if not enforced may lead to certain artefacts in the final rendered output.

The Applicants, however, believe that there remains scope for improvements to the operation of graphics processor when performing a sequence of rendering jobs, and wherein there may be certain data (processing) dependencies between different rendering jobs in the sequence of rendering jobs being performed.

BRIEF DESCRIPTION OF THE DRAWINGS

A number of embodiments of the technology described herein will now be described by way of example only and with reference to the accompanying drawings, in which.

DETAILED DESCRIPTION

Figure 1:
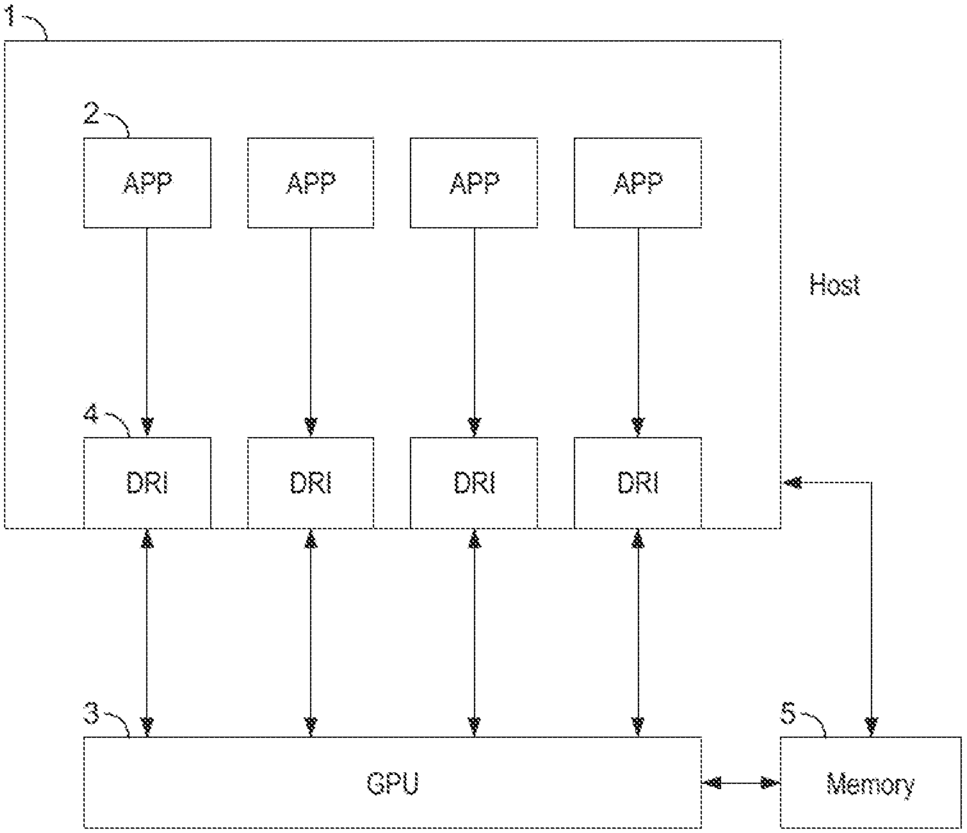
FIG. 1 shows an exemplary computer graphics processing system.

A first embodiment of the technology described herein comprises a method of operating a graphics processor when performing a sequence of rendering jobs, wherein each rendering job in the sequence of rendering jobs comprises a respective set of rendering tasks to be processed to produce a respective one or more render output(s) for the rendering job, the method comprising:

when performing a certain sequence of rendering jobs that produces a series of progressively lower resolution versions of the same render output in which there is a change in resolution between the render outputs produced by different rendering jobs in the sequence of rendering jobs:

issuing rendering tasks for a second, later rendering job in the sequence of rendering jobs for processing concurrently with rendering tasks for a first, earlier rendering job in the sequence of rendering jobs; and when a rendering task for the second, later rendering job is to be processed the processing of the rendering task for the second, later rendering job depending on processing of a rendering task for the first, earlier rendering job:

controlling at least some processing of the rendering task for the second, later rendering job based on determining whether the rendering task for the first, earlier rendering job on which the at least some processing of the rendering task for the second, later rendering job depends has completed its processing, wherein the determining whether the rendering task for the first, earlier rendering job on which the at least some processing of the rendering task for the second, later rendering job depends has completed its processing comprises looking up a corresponding entry for the rendering task in a respective 'task completion status' data structure associated with the first, earlier rendering job, the 'task completion status' data structure associated with the first, earlier rendering job containing a plurality of entries each capable of storing for a respective set of one or more rendering tasks for the first, earlier rendering job a respective indicator as to whether the set of one or more rendering tasks has completed its processing, and wherein the looking up the corresponding entry for the rendering task in the 'task completion status' data structure for the first, earlier rendering job in embodiments takes into account the change in resolution between the first, earlier rendering job and the second, later rendering job.

A second embodiment of the technology described herein comprises a graphics processor comprising:

a set of one or more processing cores; and a control circuit configured to:

when performing a certain sequence of rendering jobs that produces a series of progressively lower resolution versions of the same render output in which there is a change in resolution between the render outputs produced by different rendering jobs in the sequence of rendering jobs:

cause a task issuing circuit of the graphics processor to: issue rendering tasks for a second, later rendering job in the sequence of render passes for processing concurrently with rendering tasks for a first, earlier rendering job in the sequence of rendering jobs; and the control circuit further configured to:

when a rendering task for the second, later rendering job is to be processed, the processing of the rendering task for the second, later rendering job depending on processing of a rendering task for the first, earlier rendering job:

control at least some processing of the rendering task for the second, later rendering job based on determining whether the rendering task for the first, earlier rendering job on which the at least some processing of the rendering task for the second, later rendering job depends has completed its processing, wherein the determining whether the rendering task for the first, earlier rendering job on which the at least some processing of the rendering task for the second, later rendering job depends has completed its processing comprises looking up a corresponding entry for the rendering task in a respective 'task completion status' data structure associated with the first, earlier rendering job, the 'task completion status' data structure associated with the first, earlier rendering job containing a plurality of entries each capable of storing for a respective set of one or more rendering tasks for the first, earlier rendering job a respective indicator as to whether the set of one or more rendering tasks has completed its processing, and wherein the looking up the corresponding entry for the rendering task in the 'task completion status' data structure for the first, earlier rendering job in embodiments takes into account the change in resolution between the first, earlier rendering job and the second, later rendering job.

The technology described herein relates generally to the operation of a graphics processor when performing a sequence of rendering jobs, in particular in the situation where there may be certain data (processing) dependencies between different rendering jobs in the sequence of rendering jobs that is being performed.

For instance, the graphics processor may be, and in an embodiment is, operable and configured to perform a sequence of render passes, wherein each render pass in the sequence of render passes is associated with, and generates, a respective output. Each render pass may in turn comprise one or more rendering jobs for processing (part of) the respective output for the render pass.

As mentioned above, however, the output for a given render pass may be a "final" output, e.g. a frame for display, but may also be an "intermediate" output (e.g. a "render to texture" output) that is then used by a later render pass in the sequence of render passes for generating its output. Likewise, the processing of a particular "final" output, e.g. frame, may in some cases re-use (at least some) processing of an earlier "final" output (e.g. frame). Thus, there may be certain data (processing) dependencies that should be enforced between rendering jobs for different render passes. Likewise, there may be certain data (processing) dependencies that should be enforced between different rendering jobs within the same render pass, e.g. where a "compute" job relates to an output produced by a preceding fragment rendering job, for instance, such that the "compute" job uses the data generated by the fragment rendering job. The technology described herein particularly relates to such situations where there are possible data (processing) dependencies between rendering jobs that may need to be enforced.

Each of the rendering jobs in the sequence of rendering jobs being performed in the technology described herein can be (and is) subdivided into a respective set of rendering tasks that is to be processed for an overall output (render target) for the render pass for which the rendering job is being performed for. For example, a render pass may, and generally will, include one or more fragment rendering jobs for producing a respective render output (e.g. frame) for the render pass, wherein the rendering tasks within a fragment rendering job generate respective portions (e.g. regions) of the overall output (frame). However, a particular render pass may also include various other types of rendering jobs such as "compute" jobs for performing calculations in respect of the (same) render output produced by a previous fragment rendering job within the same render pass (and wherein the rendering tasks for "compute" job may therefore, and in an embodiment do, perform such calculations in respect of certain portions (e.g. regions) of the overall output (render target)). That is, the rendering jobs within a given render pass may, and generally do, relate to the same overall output (e.g. frame), and the rendering tasks within each rendering job therefore in an embodiment relate to rendering operations (e.g. fragment shading in the case of a fragment shading job, or calculations in the case of a "compute" job) performed in respect of the same overall output for the render pass.

The graphics processor includes a set of one or more, and in an embodiment plural, processing (shader) cores that are operable to and configured to process these rendering tasks for the overall output (render target) for the rendering job. In embodiments, at least some, and in some cases all, of the rendering jobs, comprise a plurality of rendering tasks, which plural rendering tasks for the rendering job can be performed separately, e.g., and in an embodiment, in parallel across plural processing (shader) cores of the graphics processor. Each rendering task associated with a respective rendering job may therefore, and in an embodiment does, correspond to a respective portion of the overall output (render target) for the rendering job. Each rendering task thus in an embodiment corresponds to a respective instance of a graphics processing workload that can be (and is to be) executed by a respective processing (shader) core of the graphics processor.

Thus, the data (processing) dependencies between rendering tasks for different rendering jobs will typically (and in an embodiment) relate to only a portion of the overall output (e.g. the dependencies that can be handled by the technology described herein are typically data (processing) dependencies relating to certain regions of an overall render output being generated). Thus, when a rendering task within a particular rendering job performs processing relating to a certain region of a render output (e.g. where the rendering task writes data to a particular location within a data buffer (render target) corresponding to that region), any rendering tasks for later rendering jobs that require data relating to that (same) region of the render output may then have a data (processing) dependency on the earlier rendering task that needs to be managed. (On the other hand the later rendering tasks may not have any data (processing) dependencies on earlier rendering tasks that relate strictly to different regions of the render output.)

For example, and in an embodiment, the output (render target) for each rendering job is subdivided into a plurality of rendering tasks each corresponding to a respective "tile" or sub-region into which the overall render output (e.g. frame) associated with the rendering job has been subdivided for rendering purposes, i.e. for a tile-based rendering system, such that the individual rendering tasks to be processed for a particular rendering job generate respective portions (e.g. sub-regions) of the overall output (render target) associated with the rendering job. Therefore, the rendering tasks into which the rendering job is subdivided may, e.g., and in an embodiment do, correspond to (individual) rendering tiles into which the output (render target) for the rendering job has been subdivided for rendering purposes (and any references herein to rendering "tasks" may in embodiments be taken to refer to rendering "tiles"). Various arrangements would however be possible for defining suitable sets of rendering tasks to be performed within a given rendering job for generating a respective output for that rendering job.

Thus, the graphics processing workload within a given rendering job may, and in an embodiment does, involve issuing a plurality of (separate) rendering tasks (e.g. tiles) for processing, with each rendering task generating a respective render output (which is a respective portion of an overall render output associated with the rendering job), which rendering tasks may then be processed, e.g. in parallel, by respective processing (shader) cores of the graphics processor. The respective output(s) for individual rendering tasks can then be, and in an embodiment are, stored in a suitable intermediate buffer (e.g. a tile buffer in a tile-based rendering system), and once the processing of a rendering task is finished, the (final) output (or outputs) of that rendering task can then be written out accordingly, e.g. to a respective data buffer (render target) that the rendering job writes to, at which point the processing of the rendering task is complete.

Once all of the rendering tasks for a rendering job have completed their processing, and the respective outputs been written out appropriately, the rendering job is thus finished.

The graphics processor then continues in this way for the next and further rendering jobs in the sequence of rendering jobs being performed until all of the rendering jobs in the sequence of rendering jobs have finished (or until the application requiring the graphics processing stops the current sequence of rendering jobs, e.g. to generate a different sequence of outputs (e.g. frames).

The graphics processing workload for each render pass in a sequence of render passes being performed is therefore typically similar, with each render pass generally including a similar set of rendering jobs, and each rendering job including a similar set of rendering tasks to be performed (but with the different render passes producing different outputs (render targets)). The rendering tasks that are to be performed for a rendering job may be, and in an embodiment are, issued for processing in a set, e.g. predefined, order, but the processing of the rendering tasks can be (and is) allocated to the available processing (shader) cores of the graphics processor appropriately so that at least some processing of different rendering tasks is performed concurrently, e.g. in parallel, across the available processing (shader) cores. In general, the time to completion for different rendering tasks may be different and so the rendering tasks for different rendering jobs (for different render passes) may complete out of order (and, correspondingly, if rendering tasks for different rendering jobs are performed concurrently, which is the case in embodiments of the technology described herein, as will be explained further below the rendering tasks for different rendering jobs (for different render passes) may therefore complete out of order).

The allocation of rendering tasks to processing cores may thus be, and in an embodiment is, generally performed to try to balance the processing between the available processing (shader) cores of the graphics processor, and ensure higher utility of the available processing (shader) cores. Thus, a suitable task issuing circuit (task iterator) of the graphics processor may suitably control the scheduling and allocation of rendering tasks to processing (shader) cores in order to try to allocate rendering tasks to available processing (shader) cores, and hence increase utilisation of the processing (shader) cores.

However, the present Applicants recognise that there may still be instances within a particular render pass, or rendering job within a render pass, where there may be relatively lower utilisation of the available processing (shader) cores.

For example, this may particularly the case towards the end of a rendering job where there may be relatively fewer rendering tasks remaining to be completed for the rendering job compared to the number of available processing (shader) cores. Similar situations can also exist at the start of the rendering job where the workload may be focussed in the fragment "frontend", without requiring full processing (shader) core utilisation. Other situations of possible low processing (shader) core utilisation may include, for example, where the rendering job is itself relatively smaller and does not include enough rendering tasks to fully utilise all of the available processing (shader) cores.

A 'rendering job' is thus a self-contained chunk of processing work including one or more rendering tasks relating to a particular render output and there may be certain data (processing) dependencies between different rendering jobs in a sequence of rendering jobs that is being performed. A rendering job may however be part of a larger 'render pass' that comprises a plurality of different types of rendering jobs relating to the same render output. As mentioned above, the data (processing) dependencies between rendering jobs may therefore be data (processing) dependencies that exist between rendering jobs for different render passes, but could also be data (processing) dependencies between rendering jobs within the same render pass.

In some more traditional graphics processing arrangements a strict (hard) processing barrier is therefore enforced between such rendering jobs such that no rendering tasks for a later processing job are issued for processing until all of the rendering tasks for an earlier processing job on which it depends have completed their processing, e.g. in case there are any potential data (processing) dependencies between the rendering jobs that need to be enforced, for example where a rendering job uses data generated by one or more previous rendering jobs.

Thus, if the rendering jobs in the sequence of rendering jobs were performed strictly one-after-another, i.e. with strict (hard) processing barriers between different rendering jobs, and hence no overlap between the processing of different rendering jobs in the processing (shader) cores (as may be done in some more traditional graphics processing arrangements), there may be significant instances of relatively lower processing (shader) core utilisation, e.g., and in particular, where the graphics processor is finishing off processing for an earlier rendering job but can't yet start to issue and processing rendering tasks for a subsequent rendering job due to the strict processing barrier between the rendering jobs.

To address this, and provide an improved graphics processor performance, the technology described herein thus provides a novel mechanism to safely allow processing for separate rendering jobs to overlap in the graphics processor processing (shader) cores, i.e. such that rendering tasks for different rendering jobs are able to run concurrently. For example, and in some embodiments of the technology described herein, rendering tasks for different rendering jobs are able to run concurrently (e.g. in parallel) across different processing (shader) cores of the graphics processor.

In some embodiments, the graphics processor may be configured such a particular processing (shader) core can only execute rendering tasks from a single fragment context (i.e. rendering job). In that case, when separate rendering job (potentially for separate render passes) are to be overlapped in the manner of the technology described herein, the rendering tasks from different rendering jobs may be (and will be) issued to different processing (shader) cores for processing. However, in general, rendering tasks for different rendering jobs could also run concurrently within the same processing (shader) core, e.g. so long as the graphics processor is appropriately configured with a mechanism to guarantee forward progress of the earlier rendering job so that any potential data (processing) dependencies can be suitably resolved. Various arrangements would be possible in this regard.

Because the graphics processor is operable to process rendering tasks for separate rendering jobs concurrently, this then means that the graphics processor (task issuing circuit) can start to issue rendering tasks for a second, later rendering job in a sequence of rendering jobs being performed for processing, and the processing (shader) cores can start processing those rendering tasks, without having to wait for all of the rendering tasks for the first rendering job to have completed their processing. Thus, the technology described herein advantageously avoids a strict (hard) processing barrier between separate rendering jobs.

Thus, as will be explained further below, the graphics processor of the technology described herein is operable and configured to permit rendering tasks for different rendering jobs to be processed concurrently, i.e. without necessarily enforcing a strict (hard) processing barrier between separate rendering jobs. Thus, in embodiments, the graphics processor is generally operable and configured to permit a set of one or more processing cores of the graphics processor to process rendering tasks for different rendering jobs concurrently such that processing for separate rendering jobs may overlap within the graphics processor processing (shader) cores, with any data (processing) dependencies between rendering tasks for the different rendering jobs being enforced by the graphics processor (hardware), e.g. within the graphics processor processing (shader) cores. This can then avoid a strict (hard) processing barrier between different rendering jobs, and hence provide an improved graphics processor performance, e.g., and in particular, in terms of speed and average processing (shader) core utilisation.

As will be explained further below, in embodiments, this operation generally relies on tracking the 'completion status' of rendering tasks for different render passes using respective 'task completion status' data structures, with the respective 'task completion status' data structure for a particular rendering job generally comprising a plurality of entries, each entry corresponding to a particular rendering task or group of plural rendering tasks that are to be processed for the rendering job in question. When potential data (processing) dependencies are identified between respective rendering tasks from different rendering jobs that may be being performed concurrently, the processing of the rendering tasks for the later rendering job can be (and in an embodiment is) controlled accordingly based on the completion status of the rendering tasks for the earlier rendering job on which its processing depends to enforce the dependency, e.g., and in an embodiment, by stalling at least some processing of the rendering task for the later rendering job, as needed. For example, the processing of a rendering task for a later rendering job can thus be controlled (e.g. stalled) based on a determination as to whether or not any rendering tasks for an earlier rendering job on which its processing depends have completed their processing, and this determination can be (and is) made using and based on the respective 'task completion status' data structure for the earlier rendering job.

When a rendering task for a later rendering job is to be processed, where the processing of the rendering task depends on one or more rendering tasks for an earlier rendering job in the sequence of rendering jobs being performed, a suitable lookup may then be made to the respective entry or entries of the 'task completion status' data structure for the earlier rendering job associated with the one or more rendering tasks for the earlier rendering job on which the processing of the rendering task for the later rendering job depends to determine whether or not those rendering tasks have completed their processing, and hence whether it is safe to start/continue processing the rendering task for the later rendering job.

Thus, as will be explained further below, the graphics processor of the technology described herein is generally operable and configured to permit rendering tasks for different rendering jobs to be processed concurrently, i.e. without necessarily enforcing a strict (hard) processing barrier between separate rendering jobs. That is, in embodiments, the graphics processor is operable and configured to permit a set of one or more processing cores of the graphics processor to process rendering tasks for different rendering jobs concurrently such that processing for separate rendering jobs may overlap within the graphics processor processing (shader) cores, with any data (processing) dependencies between rendering tasks for the different rendering jobs being enforced by the graphics processor (hardware), e.g. within the graphics processor processing (shader) cores. This can then avoid a strict (hard) processing barrier between different rendering jobs, and hence provide an improved graphics processor performance, e.g., and in particular, in terms of speed and average processing (shader) core utilisation.

In the approach described above, when controlling the processing of a rendering task for a later rendering job, a 'lookup' may therefore need to be made to the respective 'task completion status' data structure for an earlier rendering job to determine whether (or not) any rendering tasks for the earlier rendering job on which processing of the rendering task for the later rendering job depends are still being processed, e.g. so that processing of the rendering task for the later rendering job can be appropriately controlled (e.g. stalled), as required, to enforce the data (processing) dependency.

In general, a rendering task for a later rendering job may have a data (processing) dependency on any of the rendering tasks for the earlier rendering job, and so as part of this dependency checking operation, the graphics processor generally must determine (first) which (if any) of the rendering tasks for the earlier rendering job the rendering task for the later rendering job is potentially dependent on. This can be done in various suitable ways, as desired, but typically (and in an embodiment) involves determining whether a rendering task for the earlier rendering job is working on the same portion of a data buffer (render target) that the rendering task for the later rendering job requires. That is, a given rendering task will typically only access a certain portion of a data buffer (render target). Thus, it is only when rendering tasks for different rendering jobs require access to the same portion of a data buffer (render target) that there is a possible data (processing) dependency that needs to be enforced. Thus, as mentioned above, the data (processing) dependencies generally relate to certain portions (e.g. regions) of a data buffer (render target), and so rendering tasks that work on strictly different portions (regions) of the data buffer (render target) can safely be processed concurrently.

The determination as to which rendering tasks for an earlier rendering job relate to the same portion of the data buffer (render target) that the rendering task for a later rendering job requires to access, and hence the determination as to which entries in the 'task completion status' data structure need to be checked when performing the rendering task for the later rendering job, can thus involve some processing effort.

The present Applicants recognise, however, that there may be certain situations where such a determination can be avoided, e.g., and in particular, when it is already known (or can be determined) in advance which rendering tasks in a later rendering job are dependent on which rendering tasks in an earlier rendering job, such that the relevant entries in the 'task completion status' data structure can be checked accordingly without having to first determine which entries may need to be checked. An example of this would be when performing a certain sequence of rendering jobs that produces a series of progressively lower resolution versions of the same render output in which there is a change in resolution between the render outputs produced by different rendering jobs in the sequence of rendering jobs. In that case, because each rendering job is producing a (different resolution) version of the same render output, the data (processing) dependencies will only exist between 'equivalent' rendering tasks in the different rendering jobs, i.e. rendering tasks that relate to the equivalent, same portion (e.g. region) of the render output. For example, the rendering task corresponding to the top left region of the render output in a later rendering job will depend on the equivalent rendering task corresponding to the top left region of the render output in the previous rendering job, and so on.

The technology described herein relates particularly to such situations where the graphics processor is performing a certain sequence of rendering jobs that produces a series of progressively lower resolution versions of the same render output in which there is a change in resolution between the render outputs produced by different rendering jobs in the sequence of rendering jobs. In that case, as mentioned above, because it is known that rendering tasks will depend (only) on equivalent rendering tasks in the previous rendering job, there may be no need to explicitly determine for which entries within the 'task completion status' data structure a lookup should be performed (and so this is in an embodiment not done).

However, the present Applicants further recognise that in this case the graphics processor will then need to take the change in resolution between rendering jobs into account when performing such lookups.

For instance, the addressing logic for performing such 'lookups' may be relatively straightforward when the render outputs for different rendering jobs have the same resolution (footprint) since in that case the addressing logic may be the same for the respective 'task completion status' data structures for both rendering jobs and so the lookup can be performed using a suitable task identifier (e.g. a set of (x, y) address co-ordinates defining the position of the rendering task within the 'task completion status' data structure) which task identifier will be the same for equivalent rendering tasks in different rendering jobs. For instance, in the case where the render outputs for different rendering jobs have the same resolution (footprint), the rendering task corresponding to the entry at a particular position (a, b) of the 'task completion status' data structure for the later rendering job will be equivalent to the rendering task corresponding to the entry at that same position (a, b) of the 'task completion status' data structure for the later rendering job.

However, when the render outputs for different rendering jobs have different footprints (i.e. there is a change in resolution between different rendering jobs in a sequence of rendering jobs), the equivalent rendering tasks between different rendering jobs will have different addresses within the respective 'task completion status' data structures for the different rendering jobs as a result of this change in resolution.

The present Applicants have recognised, therefore, that when the graphics processor is performing a certain sequence of rendering jobs that produces a series of progressively lower resolution versions of the same render output in which there is a change in resolution between the render outputs produced by different rendering jobs in the sequence of rendering jobs, the lookup should be (and therefore is) modified in order to take this change in resolution into account in order to be able to look up the correct entry in the 'task completion status' data structure for the previous rendering job, i.e. the entry that relates to the equivalent rendering task on which it is known that the current rendering task (for the current, later rendering job) depends.

Thus, in such situations where it is known in advance that a given rendering task for a later rendering job depends only on an equivalent rendering task for an earlier rendering job (and so it is known to which entry the lookup should be performed), but wherein there is a change in resolution between rendering jobs, then so long as the change in resolution occurs in a certain, e.g. selected, manner, the graphics processor is able to (and does) suitably take the change in resolution into account when performing such lookups in order to lookup the correct entry. This in an embodiment then avoids the graphics processor having to perform an explicit determination as to which of the entries of the 'task completion status' data structure it is needed to lookup the respective task completion status, and hence simplifies the overall dependency checking operation (e.g. compared to the situation where it is not known in advance which rendering tasks depend on which rendering tasks and so this must be determined by the graphics processor when performing a dependency check).

So long as the graphics processor is able to determine or identify a change in resolution between rendering jobs, this change in resolution can then be suitably taken into account when performing the lookup. This could therefore be done dynamically.

At least in its embodiments, however, the technology described herein relates to situations where there is a certain, "predefined" change in resolution between the render outputs produced by different rendering jobs in the sequence of rendering jobs. For example, there are certain special situations where the render output resolution (footprint) changes between the rendering jobs in a certain, predefined manner. In this case, the change in resolution may be fixed and determined by the graphics processor hardware, for example.

A particular example of this would be when the graphics processor is performing a so-called "mipmap" generation sequence. In graphics processing, as defined by various graphics APIs, "mipmaps" are pre-calculated sequences of images, each of which is a progressively lower resolution representation of the previous image in the sequence. The use of such "mipmaps" can therefore help to increase rendering speed and reduce aliasing artefacts. For example, different resolution mipmaps can be used depending on the desired level of detail, and this can be a more efficient way of downsampling a texture, e.g. compared to sampling the full (highest) resolution image and then performing explicit downsampling.

In such a case, it will be appreciated that because the change in resolution between rendering jobs in the sequence of rendering jobs takes place in a predefined, and hence predictable, manner, it is possible to then take into account the predefined change in resolution when performing the determining based on the respective task completion status data structure for the first, earlier rendering job whether the rendering task for the first, earlier rendering job has completed its processing. Thus, and for example, so long as the graphics processor can identify when the sequence of rendering jobs it is currently performing comprises such a sequence of rendering jobs that produces a series of progressively lower resolution versions of the same render output in which there is a predefined change in resolution between the render outputs produced by different rendering jobs in the sequence of rendering jobs (e.g. a so-called "mipmap" generation sequence), the graphics processor is then able to take the change in resolution between rendering jobs into account in order to and to use the task completion status data structure to enforce any data (processing) dependencies between the rendering jobs, as required.

According to the technology described herein, the determining whether the rendering task for the first, earlier rendering job on which the at least some processing of the rendering task for the second, later rendering job depends has completed its processing generally comprises looking up a corresponding entry for the rendering task in a respective 'task completion status' data structure associated with the first, earlier rendering job. The 'task completion status' data structure associated with the first, earlier rendering job thus contains a plurality of entries each capable of storing for a respective set of one or more rendering tasks for the first, earlier rendering job a respective indicator as to whether the set of one or more rendering tasks has completed its processing.

Each entry of the 'task completion status' data structure (i.e. each rendering task or group of rendering tasks) thus has a respective 'address' defined relative to and within the 'task completion status' data structure. (For example, the 'task completion status' data structure may be arranged as an array, with the top left entry corresponding to the first rendering task, and so on.) In order to lookup the completion status for a particular rendering task, it is thus necessary to determine the appropriate entry address for that rendering task. However, in the case that the resolution (footprint) changes between rendering jobs, the entries of the respective 'task completion status' data structures may correspond to different-sized rendering tasks (for example, when the rendering tasks are tiles, the entries of the respective 'task completion status' data structure for a later rendering job represent downscaled versions of the entries for the 'task completion status' data structure for an earlier rendering job), and so equivalent rendering tasks in different rendering jobs may have different addresses within the respective 'task completion status' data structures for their associated rendering job. For example, when a later rendering job produces a 2×2 downscaled version of the render output for an earlier rendering job, a particular rendering task for the earlier rendering job may have an address (x, y) within its respective 'task completion status' data structure, whereas the address for the equivalent rendering task for the later rendering job within its respective 'task completion status' data structure may be (x/2, y/2).

Thus, according to the technology described herein, the looking up the corresponding entry for the rendering task in the 'task completion status' data structure for the first, earlier rendering job takes into account the change in resolution between the first, earlier rendering job and the second, later rendering job.

This can be done in various suitable ways, as desired, so long as the change in resolution between the rendering jobs is taken into account such that the appropriate entries can be looked up.

For example, in some embodiments, the 'task completion status' data structure for the first, earlier rendering job is generated and maintained at the resolution of the first, earlier rendering job, and the 'lookup' that is performed when making such a determination for a particular rendering task for the second, later render output may be appropriately scaled based on the change in resolution to perform the desired lookup to the 'task completion status' data structure for the first, earlier rendering job at the correct resolution, i.e. the resolution of the first, earlier rendering job. That is, in some embodiments, the addressing logic is modified when reading/checking a particular 'task completion status' data structure based on the change in resolution so that the lookup is performed at the correct (desired) resolution.

As another example, and in other embodiments, a first version of the 'task completion status' data structure for the first, earlier rendering job may be generated at the resolution of the first, earlier rendering job, but the first version the 'task completion status' data structure for the first, earlier rendering job may then be explicitly downscaled to match the resolution of the second, later rendering job. In that case, the 'task completion status' data structure that is written out and checked against is in an embodiment written at the correct (desired) resolution (i.e. the resolution that will be required by the later rendering job) (in which case the addressing logic may not need to be modified, and so in an embodiment this is not done).

Thus, in embodiments, the respective 'task completion status' data structure for the first, earlier rendering job and/or the addressing logic used to perform the lookup to the respective 'task completion status' data structure are suitably modified (e.g. scaled) in order to take the change in resolution into account.

Various other arrangements may of course be possible.

When it is determined that the rendering task for the earlier rendering job on which processing of a rendering task for a later rendering job depends has completed its processing, this means that the data (processing) dependency has cleared, and so the rendering task for the later, rendering job can safely be processed (and in an embodiment the rendering tasks is therefore processed).

On the other hand, if the rendering task for the earlier rendering job has not completed its processing, at least some processing of the rendering task for the later rendering job may be stalled until it can be determined that the data (processing) dependency has cleared. The control that is performed in this case may be performed in any suitable and desired manner, e.g. so long as the data (processing) dependency is suitable enforced.

For example, in embodiments, the rendering task may be stalled in the task issuing circuit, such that the issuing of the rendering task is stalled until the data (processing) dependency has cleared. This may also be appropriate and necessary in the case where the data (processing) dependency relates to data that may be required relatively earlier within the graphics processing pipeline. In embodiments, however, the graphics processor is configured and operable to stall processing of the rendering task at the point at which the data is required, e.g. at a respective memory access. This then means that at least some processing (e.g. in a fragment frontend of the graphics processor) may still be performed, with the processing only being stalled at the point at which the relevant data is required to be accessed.

Various arrangements would be possible in this regard.

The technology described herein also works well in the situation where a particular rendering job itself is configured and operable to also produce a second, lower resolution version of its own render output. For example, graphics APIs typically allow "mipmaps" to be generated by the graphics processor (hardware) in any suitable and desired manner. Thus, in some graphics processor, and in embodiments, when generating such a sequence of "mipmaps", a particular rendering job may be configured and operable to produce a first version of a render output (with the rendering tasks that are processed for that rendering job generating that first version of a render output) and to also produce a second, lower resolution of that render output at the same time.

This may be done during a write-out operation performed for the rendering tasks that are processed for the rendering job in question. For example, each rendering task may generate a respective portion of the overall render output, which is then written out accordingly when the rendering task has completed its processing. In embodiments, when multisample anti-aliasing (MSAA) techniques are being used in which multiple sampling positions may be processed for each element (e.g. pixel) of the render output, the rendering job may thus produce a first, multisampled version of the render output. In this case, however, a second, lower resolution of the same render output can be produced at the same time, i.e. by the write-out stage, by writing out a second version of the render output without multisampling. For instance, when 4xMSAA is used, a given rendering job may involve processing a set of rendering tasks to produce a first 4xMSAA version of the render output but the rendering job may also produce a 2×2 downscaled (width/2, height/2) version of that render output at the same time.

That is, each rendering job may, and in some embodiments does, produce two "mipmaps", and the technology described herein is also operable and configured to handle such situations.

In this case, note that the subsequent rendering job will generally depend (only) on the lower resolution version of the render output produced by the previous rendering job (e.g. since "mipmap" sequences are highly serialised). However, the data (processing) dependencies can be managed in essentially the same way as described above as the rendering tasks that produce the lower resolution version of the render output are the same rendering tasks that produce the higher resolution version of the render output (since the lower resolution version is simply generated by the (same) write out operation that generates the higher resolution version of the render output, i.e. such that a single rendering task generates a corresponding portion of both of the render outputs that are produced by the rendering job at the same time). That is, the same rendering tasks produce both versions of the render output, and so the same 'task completion status' data structure for a particular rendering job can be used for both versions of the render output that are produced for that rendering job when the 'task completion status' data structure is to be checked for a rendering task for a later rendering job, again so long as the change in resolution is appropriately taken into account when doing this.

As mentioned above, the technology described herein relates particularly to the case where the graphics processor is performing a sequence of rendering jobs that produces a series of progressively lower resolution versions of the same render output in which there is a change in resolution between the render outputs produced by different rendering jobs in the sequence of rendering jobs (e.g. a so-called "mipmap" generation sequence). The operation according to the technology described herein may therefore be, and in an embodiment is, selectively performed based on the graphics processor identifying that a following sequence of rendering jobs is such a sequence. This identification can be done in any suitable manner as desired.

For example, this will typically be determined by the host processor (CPU) (e.g. driver) which may then set a suitable flag indicating to the graphics processor that the following sequence of rendering jobs is such a sequence. When the graphics processor encounters a rendering job for which the flag is set, this can then (and in an embodiment does) trigger the operation described above.

Thus, in embodiments, the method comprises (and the graphics processor is configured to) identifying that a sequence of rendering jobs to be performed is a sequence of rendering jobs that produces a series of progressively lower resolution versions of the same render output in which there is a change in resolution between the render outputs produced by different rendering jobs in the sequence of rendering jobs. When this situation is identified, the sequence of rendering jobs that produces the series of progressively lower resolution versions of the same render output can then be (and is) processed in the manner of the technology described herein, e.g. as described above.

The sequence of rendering jobs that produces a series of progressively lower resolution versions of the same render output in which there is a change in resolution between the render outputs produced by different rendering jobs in the sequence of rendering jobs may generally comprise any suitable and desired number of rendering jobs. For example, a typical "mipmap" generation sequence may include up to 12 stages of "mipmap" generation. Thus, when each rendering job can produce two "mipmaps", the "mipmap" sequence may accordingly include six rendering jobs. Various other arrangements would however of course be possible.

Similarly, the change in resolution that is defined between rendering jobs in the sequence of rendering jobs may be set as desired. Typically, and in embodiments, the change in resolution may be defined in powers-of-two. For example, when each rendering job can produce two render outputs, the lower resolution render output produced by a particular rendering job may, and in some embodiments does, comprise a 2×2 downscaled version of the higher resolution render output produced by that same rendering job (e.g. with the height and width both being downscaled by a factor of 2). In that case, the next rendering job may produce a higher resolution render output that is a 2×2 downscaled version of the lower resolution render output produced by the previous rendering job, and so on, down the lowest resolution render output (i.e. produced by the final rendering job in the sequence of rendering jobs.

Once the particular sequence of rendering jobs that generates the series of progressively downscaled versions of the same render output (e.g. the "mipmap" sequence) is completed, there may then be, and typically will be, further rendering jobs to be performed (which further rendering jobs may then generate further respective render outputs and which further render outputs in general may or may not be dependent on the "mipmap" sequence). That is, the certain sequence of rendering jobs that is processed in the manner of the technology described herein is typically part of a larger overall sequence of rendering jobs being performed. In that case, a strict (hard) processing barrier should then be, and therefore in an embodiment is, enforced between the final rendering job in the sequence of rendering jobs that produces a series of progressively lower resolution versions of the same render output (e.g. the "mipmap" sequence) and the next rendering job in the overall sequence of rendering jobs that is being performed.

This is because the next rendering job in the overall sequence of rendering jobs that is being performed may generally require and hence depend on any of the different resolution versions of the (same) render output that were produced by the sequence of rendering jobs that produces a series of progressively lower resolution versions of the same render output (e.g. the next rendering job may use any of the generated "mipmaps" depending on the desired level of detail) and so it is not generally safe to start processing the next rendering job until the sequence of rendering jobs that produces a series of progressively lower resolution versions of the same render output (the "mipmap" sequence) is completed.

The technology described herein may therefore provide various benefits compared to other possible approaches.

As mentioned above, the technology described herein in an embodiment provides a novel 'task completion status' data structure that can be (and is) associated with a particular rendering job (for a particular render pass) and that can be used to track the completion status of rendering tasks for the particular rendering job with which the 'task completion status' data structure is associated. Thus, the 'task completion status' data structure for a particular rendering job in an embodiment tracks which of the rendering tasks to be processed for that rendering job have completed their processing.

The task completion status of the respective rendering tasks for a given rendering job can be tracked in various suitable manners, as desired. For example, in embodiments, a task is considered to be 'complete' once the output (or all of the outputs) associated with the rendering task (and which output(s) may cause potential data (processing) dependencies) have been suitably committed to memory. Thus, in embodiments, the 'task completion status' data structure tracks when all memory accesses associated with the rendering task have finished, and the output has been suitably committed to memory such that it can be read by a subsequent rendering job (i.e. a 'point of coherency' where all (relevant) observers are guaranteed for a particular address to see the same copy of a memory location). For example, where the graphics processor includes a cache system, the point of coherency may typically be the L2 cache as later rendering jobs can read data directly from the L2 cache without the data having to go all the way back to external (main) memory. Thus, in embodiments, a suitable task complete status can be signalled, and used to update the 'task completion status' data structure accordingly, once (and in an embodiment as soon as) the rendering task has finished its processing and performed the final write out operations so that it is ensured that any data that is depended on has been committed to memory.

However, the tracking of the task completion status may generally be more or less complex as desired. For instance, where a rendering task may produce multiple different outputs, the 'task completion status' data structure could track the individual outputs. Various arrangements would be possible in this regard.

The 'task completion status' data structure for a particular rendering job may thus be, and in an embodiment is, updated during the rendering job, e.g. as and when the rendering tasks for the rendering job in question complete their processing.

A respective (separate) 'task completion status' data structure could be (and in some embodiments is) allocated for each rendering job that is currently in flight in order to track the completion status of the respective rendering tasks for the rendering job. However, it will be appreciated that data (processing) dependencies may often relate to fragment rendering jobs in particular. Thus, in some embodiments, a respective (separate) 'task completion status' data structure is allocated for each fragment rendering job, but other types of rendering jobs (e.g. "compute" jobs relating to a render output) may not have a respective 'task completion status' data structure allocated. Various arrangements would be possible in this regard.

Subject to the particular requirements of the technology described herein, the 'task completion status' data structure for a particular rendering job may take any suitable and desired form.

In embodiments, for example, the 'task completion status' data structure may, and does, store respective indicators of whether or not respective rendering tasks (or in some embodiments groups of rendering tasks) have completed their processing. The 'task completion status' data structure for rendering job may therefore, and in an embodiment does, contain a suitable plurality of entries for storing such indicators.

In some embodiments, the 'task completion status' data structure may comprise a "scoreboard" that is operable to and configured to store in respect of rendering tasks (or groups of rendering tasks) for the rendering job in question respective indicators of whether the rendering tasks (or all of the rendering tasks in a group of rendering tasks) have completed their processing. The "scoreboard" for a given rendering job can thus be consulted as part of the issuing and/or processing of rendering tasks for a later rendering job that are potentially dependent on the rendering job in question (with which the scoreboard is associated) in order to control the processing of the rendering tasks for the later rendering job accordingly to manage any required data (processing) dependencies.

In one embodiment, the 'task completion status' data structure for a rendering job may thus contain a respective entry for storing a respective indicator for each rendering task that is to be processed for the rendering job in question such that there is a one-to-one correspondence between entries in the 'task completion status' data structure and the rendering tasks to be performed for the rendering job.

In general, however, there may be any suitable and desired correspondence between entries in the 'task completion status' data structure and rendering tasks for the rendering job with which the 'task completion status' data structure is associated.

The 'task completion status' data structure for a particular rendering job (in whatever particular form the 'task completion status' data structure takes) can thus be (and is) updated as and when rendering tasks for the rendering job with which the 'task completion status' data structure are completed. The updating of the 'task completion status' data structure can be triggered in any suitable and desired manner. For example, and in an embodiment, the 'task completion status' data structure is updated in respect of a particular rendering task when the (final) output associated with the rendering task is written out, e.g. to memory. That is, the rendering task is in an embodiment considered to be "complete" when the render output for the rendering task is committed to memory (as explained above), and the 'task completion status' data structure is in an embodiment updated at this point. Thus, in embodiments, whenever a rendering task for a rendering job completes its processing, with the (final) output of the rendering task being written out, this can be (and in an embodiment is) signalled to cause an update of the 'task completion status' data structure associated with that rendering job. The entries or indicators encompassing that rendering task can then be updated accordingly based on the rendering task completing its processing.

Subject to the particular requirements of the technology described herein, and so long as it can be suitably checked at appropriate points during the graphics processing operation, the 'task completion status' data structure may generally be stored in any suitable and desired manner.

For example, in some embodiments, a global 'task completion status' data structure is stored, e.g., and in an embodiment, within a task iterator (task issuing circuit) that is operable to control the issuing of the rendering tasks to the plural processing (shader) cores of the graphics processor (e.g. as part of the task issuing circuit of the graphics processor). In that case, the 'task completion status' data structure can be queried by any particular one of the processing (shader) cores as needed in respect of a rendering task that is being performed by the processing (shader) core in question. In that case, each of the processing (shader) cores should be, and in an embodiment is, operable to update the same global 'task completion status' data structure as/when the processing (shader) core completes its processing for a rendering task. Thus, in some embodiments, when a processing (shader) core completes its processing for a rendering task, this is in an embodiment then signalled back to the task iterator (task issuing circuit), and this in an embodiment then triggers an update of the global 'task completion status' data structure.

Other arrangements would however be possible. For instance, it would also be possible for the processing (shader) cores to store their own local versions of the 'task completion status' data structure. A processing (shader) core in that case can then query its own version of the 'task completion status' data structure as needed, which may speed up the checking of the 'task completion status' data structure (e.g. rather than having to send a message to the task iterator (task issuing circuit) to query the global 'task completion status' data structure). In that case, a suitable mechanism should be provided to allow the different processing (shader) cores to communicate updates between each other. This could be done in various suitable ways as desired.

The technology described herein may generally find application in any suitable graphics processing system.

The technology described herein relates particularly to tile-based rendering systems in which a render output (e.g. a frame) is subdivided into plural rendering tiles for the purposes of rendering. In that case each rendering tile may and in an embodiment does correspond to a respective sub-region of the overall render output (e.g. frame) that is being generated. For example, a rendering tile may correspond to a rectangular (e.g. square) sub-region of the overall render output.

In embodiments the rendering is performed using rasterisation. However, it will be appreciated that the technology described herein is not necessarily limited to rasterisation-based rendering and may generally be used for other types of rendering, including ray tracing or hybrid ray tracing arrangements.

The technology described herein can be used for all forms of output that a graphics processing pipeline may be used to generate, such as frames for display, render-to-texture outputs, etc., The technology described herein can generally be used for both graphics and non-graphics (e.g. compute) workloads as well as mixed workloads.

In some embodiments, the graphics processing system comprises, and/or is in communication with, one or more memories and/or memory devices that store the data described herein, and/or store software for performing the processes described herein. The graphics processing system may also be in communication with a host microprocessor, and/or with a display for displaying images based on the data generated by the graphics processing system.

In an embodiment, the various functions of the technology described herein are carried out on a single graphics processing platform that generates and outputs the rendered data that is, e.g., written to a frame buffer for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, and pipelines of the technology described herein may comprise a suitable processor or processors, controller or controllers, functional units, circuits/circuitry, processing logic, microprocessor arrangements, etc., that are operable to perform the various functions, etc., such as appropriately configured dedicated hardware elements or processing circuits/circuitry, and/or programmable hardware elements or processing circuits/circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, if desired.

Thus the technology described herein extends to a graphics processor and to a graphics processing platform including the apparatus of or operated in accordance with any one or more of the embodiments of the technology described herein described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc..

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, RAM, flash memory, CD ROM or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible medium, such as a non-transitory computer readable medium, for example, diskette, CD-ROM, ROM, RAM, flash memory or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

FIG. 1 shows a typical computer graphics processing system. An application 2, such as a game, executing on a host processor (CPU) 1 will require graphics processing operations to be performed by an associated graphics processing unit (GPU) (graphics processor) 3 that executes a graphics processing pipeline. To do this, the application will generate API (Application Programming Interface) calls that are interpreted by a driver 4 for the graphics processor 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

As shown in FIG. 1, the graphics processing system will also include an appropriate memory system 5 for use by the host CPU 1 and graphics processor 3.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, their associated data values are then stored in memory, ready for output, e.g. for display.

In the present embodiments, graphics processing is carried out in a pipelined fashion, with one or more pipeline stages operating on the data to generate the final output, e.g. frame that is displayed.

Figure 2:
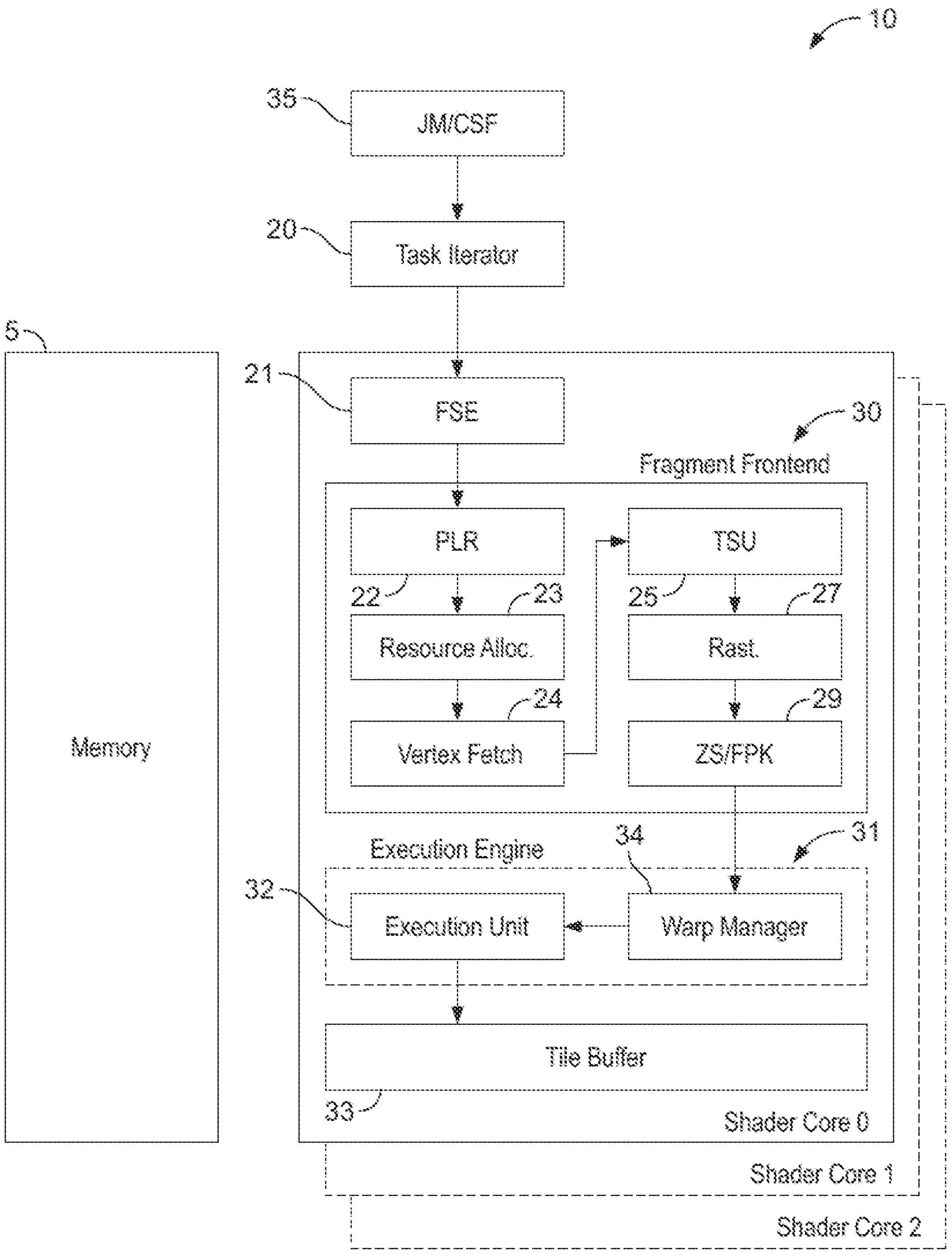
FIG. 2 shows schematically a graphics processing pipeline that can be operated in the manner of the technology described herein.

FIG. 2 shows an exemplary graphics processing pipeline 10 that may be executed by the graphics processor 3 according to an embodiment. The graphics processing pipeline 10 shown in FIG. 2 is a "tile-based" rendering system, and will thus produce tiles of an output data array, such as an output frame to be generated. Thus, an example will now be described in the context of "tile-based" rendering. In FIG. 2, the rendering is performed using rasterisation, as will be explained further below. However, it will be appreciated that the technology described herein is not necessarily limited to rasterisation-based rendering and may generally be used for other types of rendering, including ray tracing or hybrid ray tracing arrangements. Likewise, the technology described herein is not necessarily limited to tile-based rendering and may also be used for other types of rendering including immediate-mode rendering arrangements.

The output data array may typically be an output frame intended for display on a display device, such as a screen or printer, but may also, for example, comprise a "render to texture" output of the graphics processor, or other suitable arrangement.

FIG. 2 shows the main elements and pipeline stages of the graphics processing pipeline 10 according to the present embodiments. As will be appreciated by those skilled in the art, there may be other elements of the graphics processing pipeline that are not illustrated in FIG. 2.

It should also be noted here that FIG. 2 is only schematic, and that, for example, in practice the shown functional units and pipeline stages may share significant hardware circuits, even though they are shown schematically as separate stages in FIG. 2. Equally, some of the elements depicted in FIG. 2 need not be provided, and FIG. 2 merely shows one example of a graphics processing pipeline 10. It will also be appreciated that each of the stages, elements and units, etc., of the graphics processing pipeline as shown in FIG. 2 may be implemented as desired and will accordingly comprise, e.g., appropriate circuits and/or processing logic, etc., for performing the necessary operation and functions.

The graphics processing pipeline as illustrated in FIG. 2 will be executed on and implemented by the graphics processing unit (GPU) (graphics processor) 3, which will accordingly include the necessary functional units, processing circuits, etc., operable to execute the graphics processing pipeline stages.

(It will be appreciated that the graphics processing unit (GPU) (graphics processor) 3 may, and generally will, include various other functional units, processing circuits, etc., not shown in FIG. 2. This may include various functional units, processing circuits, etc., that are operable to execute non-graphics processing work. For example, in addition to graphics processing work, the graphics processing unit (GPU) (graphics processor) 3 may also be operable to perform general-purpose "compute" operations, and may therefore also include various functional units, processing circuits, etc., operable to execute such non-graphics processing work. Thus, although not shown in FIG. 2, the shader cores may for example, in addition to the fragment shader endpoint 21 that will be described below, also comprise a suitable "compute" shader endpoint that is operable and configured to issue compute tasks to the execution engine 31 for processing. The shader cores may, for example, also contain other suitable endpoints, as desired, that are operable and configured to issue other types of tasks to the execution engine 31 for processing. Various arrangements would be possible in this regard.)

FIG. 2 shows the stages of the graphics processing pipeline after a tiler (not shown) of the graphics processor has prepared the primitive lists (as the graphics processing pipeline 10 is a tile-based graphics processing pipeline).

(The tiler in effect determines which primitives need to be processed for different regions of the output. In the present embodiments, these regions may, e.g., represent a tile into which the overall output has been divided into for processing purposes, or a set of multiple such tiles. To do this, the tiler compares the location of each primitive to be processed with the positions of the regions, and adds the primitive to a respective primitive list for each region that it determines the primitive could (potentially) fall within. Any suitable and desired technique for sorting and binning primitives into tile lists, such as exact binning, or bounding box binning or anything in between, can be used for the tiling process.)

Once the tiler has completed the preparation of the primitive lists (lists of primitives to be processed for each region), then each tile can be rendered with reference to its associated primitive list(s).

To do this, each tile is processed by the graphics processing pipeline stages shown in FIG. 2.

A fragment task iterator 20 is thus provided that schedules processing work to the graphics processing pipeline 10.

The fragment task iterator 20 may thus schedule the graphics processing pipeline to generate a first output, which may, e.g. be a frame to display. In the present embodiments, wherein the graphics processing pipeline 10 is a tile-based system, in which the output has been divided into a plurality of rendering tiles, the graphics processing pipeline 10 iterates over the set of tiles for the first output, rendering each tile in turn.

As shown in FIG. 2, the graphics processor 3 includes an overall controller in the form of a job manager circuit (a command stream frontend circuit) 35, that is operable to receive tasks for the graphic processor 3 for processing from the host processor 1, which job manager 35 can then communicate the relevant jobs to respective elements of the graphics processor and graphics processing pipeline 10, via an appropriate bus/interconnect.

Thus, as shown in FIG. 2, the job manager 35 will, inter alia, issue fragment processing tasks to the fragment task iterator 20 for the fragment task iterator 20 to then schedule the appropriate fragment shading tasks to and onto the graphics processing pipeline 10.

In the present embodiments, the graphics processing pipeline 10 is implemented by means of an appropriate processing ("shader") core. In particular, as shown in FIG. 2, the graphics processor 3 includes a plurality of "shader" cores that are each configured to implement a respective parallel instance of the graphics processing pipeline 10. Thus, the fragment task iterator 20 is operable to and configured to issue tasks to different ones of the of shader cores, e.g. to try to balance processing work between the different shader cores.

(Although not shown in FIG. 2, there may be various other task iterators that control the issuing of "compute" or other tasks, etc.,)

As will be explained further below, each "shader" core includes a fragment "frontend" 30 that may be, and typically is, implemented in essentially fixed-function hardware, and that performs set up for the fragment shader programs, as well as a programmable stage (execution engine 31) that executes the fragment shader programs to perform the actual rendering.

When a rendering task (i.e. tile) is allocated to a given shader core for processing, the tile is then processed (rendered) accordingly, i.e. by the graphics processing pipeline 10.

For a given tile that is being processed, a primitive list reader (or 'polygon list reader') 22 thus identifies a sequence of primitives to be processed for that tile (the primitives that are listed in the primitive list(s) for that tile), and an ordered sequence of primitives for the tile is then issued into the graphics processing pipeline 10 for processing.

A resource allocator 23 then configures and manages the allocation of memory space for the depth (Z), colour, etc., buffers 33 for the tile of the output that is being generated. These buffers may, e.g., be provided as part of RAM that is located on (local to) the graphics processing pipeline (chip).

A vertex loader 24 then loads in the vertices for the primitives, which are then passed into a primitive set-up unit (or 'triangle set-up unit') 25 that operates to determine, from the vertices for the primitives, edge information representing the primitive edges.

The edge information for the re-ordered primitives is then passed to the rasteriser 27, which rasterises the primitives into a set of one or more sampling positions and generates from the primitives individual graphics fragments having appropriate positions (representing appropriate sampling positions) for rendering the primitive.

The fragments generated by the rasteriser 27 are then sent onwards to the rest of the pipeline for processing.

For instance, in the present embodiments, the fragments generated by the rasteriser 27 are subject to (early) depth (Z)/stencil testing 29, to see if any fragments can be discarded (culled) at this stage. To do this, the Z/stencil testing stage 29 compares the depth values of (associated with) fragments issuing from the rasteriser 27 with the depth values of fragments that have already been rendered (these depth values are stored in a depth (Z) buffer that is part of the tile buffer 33) to determine whether the new fragments will be occluded by fragments that have already been rendered (or not). At the same time, an early stencil test is carried out.

Fragments that pass the fragment early Z and stencil test stage 29 may then be subject to further culling operations, such as a 'forward pixel kill' test, e.g. as described in United States Patent Application Publication No. 2019/0088009 (Arm Limited), before the remaining fragments are then passed to a fragment shading stage, in the form of an execution engine 31, for rendering.

The processing stages including the primitive list reader (or 'polygon list reader') 22 up to the (early) depth (Z)/stencil testing 29 thus together constitute a fragment "frontend" 30 that serves to set up the required data for the fragment processing operations to be performed by the execution engine 31.

The execution engine 31 then performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs for the fragments, applying textures to the fragments, applying fogging or other operations to the fragments, etc., to generate the appropriate rendered fragment data.

Thus, as shown in FIG. 2, in the present embodiment, the execution engine 31 includes a programmable execution unit (engine) 32 operable to execute fragment shader programs for respective execution threads (where each thread corresponds to one work item, e.g. an individual fragment, for the output being generated) to perform the required fragment shading operations to thereby generate rendered fragment data. The execution unit 32 can operate in any suitable and desired manner in this regard and comprise any suitable and desired processing circuits, etc..

In the present embodiments, the execution threads may be arranged into "groups" or "bundles" of threads, where the threads of one group are run in lockstep, one instruction at a time, i.e. each thread in the group executes the same single instruction before moving onto the next instruction. In this way, it is possible to share instruction fetch and scheduling resources between all the threads in a group. Such thread groups may also be referred to as "sub-groups", "warps" and "wavefronts". For convenience the term thread group will be used herein, but this is intended to encompass all equivalent terms and arrangements, unless otherwise indicated.

FIG. 2 accordingly also shows a thread group controller, in the form of a warp manager 34, that is configured to control the allocation of work items (e.g. fragments) to respective thread groups for the fragment shading operations to be performed by the programmable execution unit 32, and the issuing of thread groups to the programmable execution unit 32 for the execution of the fragment shading programs by respective thread groups.

As shown in FIG. 2, the programmable execution unit 32 is also in communication with the memory 5.

Once the fragment shading is complete, the output rendered (shaded) fragment data is written to the tile buffer 33 from where it can, for example, be output to a frame buffer (e.g. in the memory 5) for display. The depth value for an output fragment is also written appropriately to a Z-buffer within the tile buffer 33. (The tile buffer stores colour and depth buffers that store an appropriate colour, etc., or Z-value, respectively, for each sampling position that the buffers represent (in essence for each sampling position of a rendering tile that is being processed).) These buffers store an array of fragment data that represents part (a tile) of the overall output (e.g. image to be displayed), with respective sets of sample values in the buffers corresponding to respective pixels of the overall output (e.g. each 2×2 set of sample values may correspond to an output pixel, where 4× multisampling is being used).

As mentioned above, the tile buffer 33 is normally provided as part of RAM that is located on (local to) the graphics processor.

Once a tile for the output has been processed, the data from the tile buffer(s) may thus be written back to an external memory output buffer, such as a frame buffer of a display device (not shown), e.g. in the memory 5. (The display device could comprise, e.g., a display comprising an array of pixels, such as a computer monitor or a printer.)

The next tile is then processed, and so on, until sufficient tiles have been processed to generate the entire output (e.g. frame (image) to be displayed). The process is then repeated for the next output (e.g. frame) and so on.

For a given output (e.g. frame (image) to be displayed) the graphics processor will perform at least one render pass to generate the output. In general, the generation of a given output (e.g. frame (image) to be displayed) may however involve a sequence of plural render passes (with each render pass comprising potentially plural rendering jobs to be performed). This may for example include a first render pass that generates an "intermediate" output (e.g. such as a "render to texture" output) which is then followed by a second render pass that consumes the output from the first render pass when generating its own output (which may be the "final" output (e.g. frame (image) to be displayed)).

Thus, a typical command stream for the tile-based graphics processor may include commands to perform a sequence of render passes, e.g. as follows:

```
RUN_FRAG_0
RUN_FRAG_1
...
```

with each RUN_FRAG command corresponding to a respective fragment processing (rendering) job that is to be performed using the graphics processing pipeline.

(Note that although not shown in this example a render pass for producing a particular render output (e.g. frame) may generally comprise various different types of rendering jobs, such that a fragment processing (rendering) job within a render pass may also be followed by other types of rendering jobs that relate to the same render output. An example of this might be when a "compute" job is used to calculate 'mist' effects for a respective render output produced by a fragment processing (rendering) job. Thus, a command stream may generally also contain various other types of commands for performing other types of rendering jobs, as desired.)

Although each fragment processing (rendering) job represents a separate instance of implementing the graphics processing pipeline, there may be various data (processing) dependencies between different rendering jobs being performed. For example, in the case that one rendering job generates an "intermediate" output that is to be consumed by the next rendering job, the later rendering job should generally not be performed until the earlier rendering job has been performed. More precisely, in the case of a tile-based rendering system, where a later rendering job has a data (processing) dependency on an earlier rendering job, a particular rendering task for rendering a given tile for the later rendering job should not be performed until the equivalent tile for the earlier rendering job has been processed, so that the required portion of the render output associated with that rendering tile is available.

Thus, as mentioned above, each rendering job generally comprises a plurality of rendering tasks which may, e.g., and in the present embodiments do, correspond to respective rendering tiles into which the output (render target) for the render pass is subdivided for rendering purposes. The command stream including the RUN_FRAG commands may thus be received by the job manager circuit (a command stream frontend circuit) 35, which identifies the rendering jobs to be performed, which rendering jobs are then broken down into respective smaller rendering tasks (e.g. tiles) that are provided to the fragment task iterator 20 for the fragment task iterator 20 to then schedule the appropriate fragment shading tasks to and onto the graphics processing pipeline 10. (The rendering tasks may then be further broken down into smaller work items within the shader core.)

In order to ensure that any data (processing) dependencies between rendering jobs are enforced, the job manager circuit (a command stream frontend circuit) 35 may in some more traditional graphics processing arrangements enforce a strict (hard) processing barrier between rendering jobs (which barrier may be, and traditionally is, enforced between fragment processing (rendering) jobs for different render passes, but also between different types of rendering jobs within the same render pass), e.g. such that in the example given above all of the rendering tasks associated with the RUN_FRAG_0 command would be issued and processed to completion before the job manager circuit (a command stream frontend circuit) 35 permitted any rendering tasks associated with the RUN_FRAG_1 command to be issued for processing.

Figure 3:
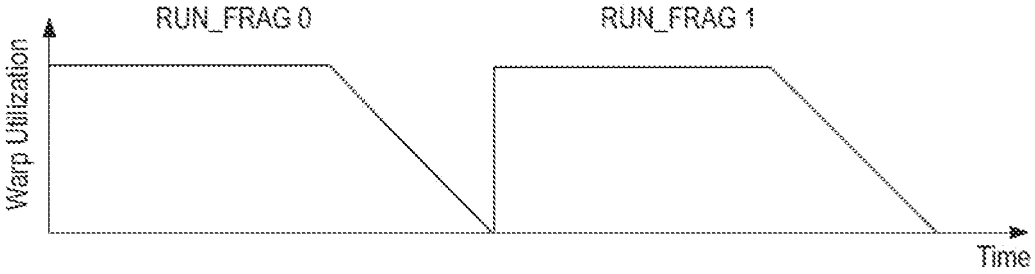
FIG. 3 illustrates a more traditional graphics processor operation in which strict processing barriers are enforced between separate rendering jobs.

This more traditional graphics processor operation is illustrated in FIG. 3. This approach works well to ensure safe graphics processing operation. However, as depicted in FIG. 3, especially towards the end of the rendering jobs, there is relatively lower warp utilisation. This is because towards the end of the rendering job, there may be fewer rendering tasks to be performed compared to the number of available shader cores. (Although not shown in FIG. 3, note that there may typically also be relatively lower warp utilisation during an initial ramp-up period). However, because of the hard (strict) processing barrier between rendering jobs, the job manager circuit (a command stream frontend circuit) 35 cannot start to issue rendering tasks for the next rendering job for processing, and so any shader cores that have completed their processing may sit idle for a number of cycles waiting for the other shader cores to finish processing their respective rendering tasks.

Figure 4:
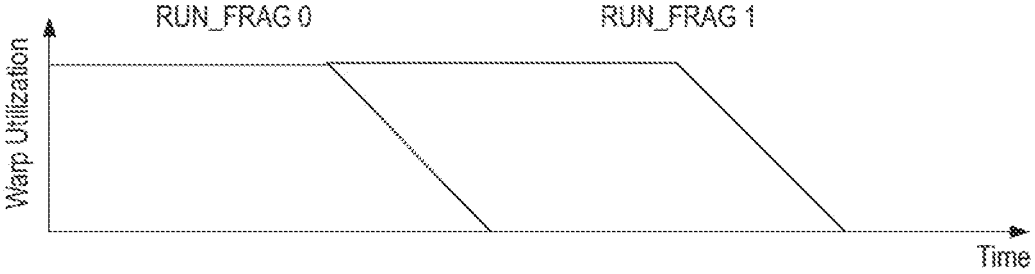
FIG. 4 illustrates an improved graphics processor operation according to embodiments of the technology described herein in which separate rendering jobs can overlap.

The present embodiments thus provide a mechanism for safely allowing separate rendering jobs to be issued for processing, and processed, concurrently, e.g. using different shader cores (although the processing could also be performed concurrently on the same shader core, e.g. so long as forward progress of the earlier rendering job can be guaranteed). This improvement is illustrated in FIG. 4, which shows that towards the end of the first rendering job (RUN_FRAG_0), the shader cores are permitted to start processing rendering tasks for the next rendering job (RUN_FRAG_1), such that the processing of rendering tasks for different rendering jobs is allowed to overlap across different shader cores, hence increasing the overall shader core utilisation.

In particular, to do this, and ensure that any data dependencies between rendering jobs can still be enforced as needed, the present embodiments track, for each rendering job that is currently in flight, the completion status of the respective rendering tasks to be performed for the rendering job in question. Based on this tracking, it is then possible to control the processing of rendering tasks for a later (e.g. the next) rendering job in a sequence of rendering jobs being performed.

Figure 5A:
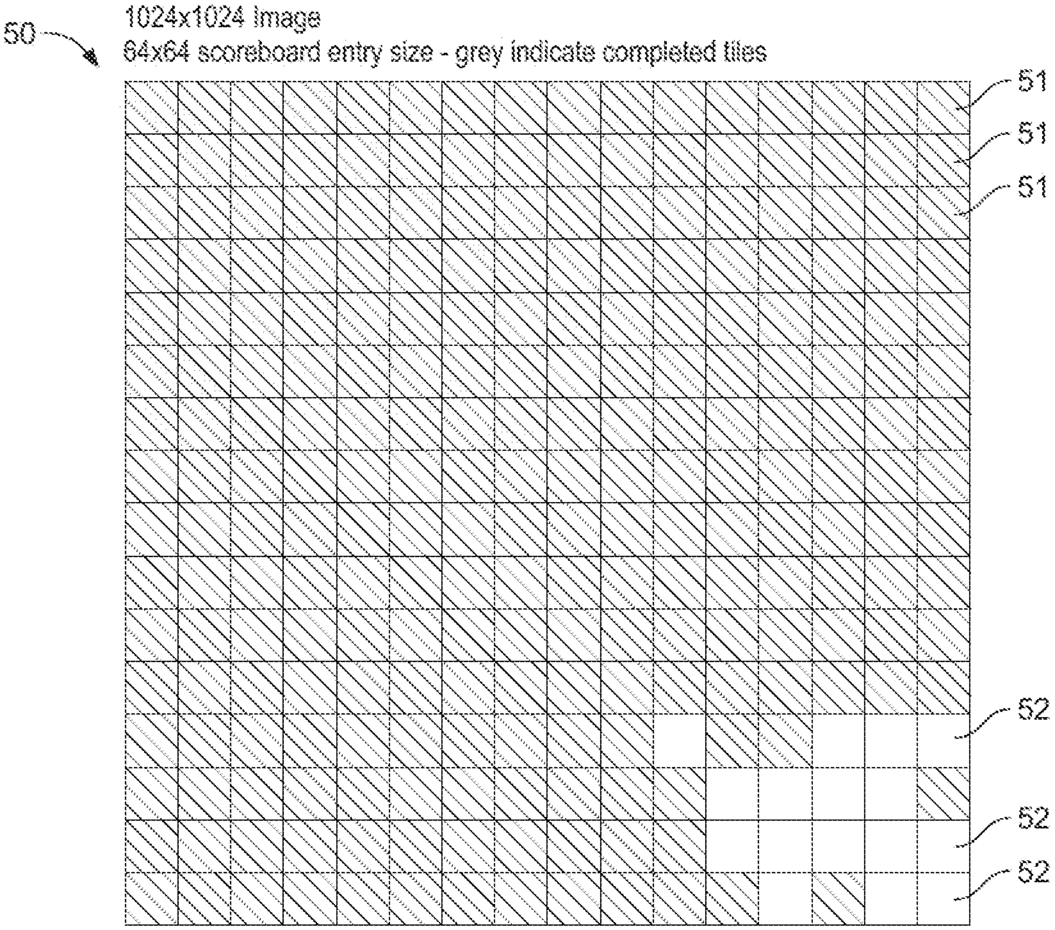
FIG. 5A shows a 'task completion status' data structure that may be used to track the completion status of rendering tasks for an associated rendering job according to a first example.

FIG. 5A shows an example of a 'task completion status' data structure 50 that may be used to track the completion status of rendering tasks for an associated rendering job. As shown in FIG. 5A, the 'task completion status' data structure 50 in this example is in the form of a tile-based "scoreboard" that is operable to track the completion status for the individual rendering tasks that the output for the rendering job is subdivided into.

For example, in the case where the render output is an 1024×1024 image, which image is subdivided for rendering purposes into a 64×64 array of rendering tiles, the 'task completion status' data structure 50 may then comprise a corresponding 64×64 array of entries, with each entry storing a (binary) indication as to whether or not the respective task (i.e. tile) associated with that entry has completed its processing. Thus, as depicted in FIG. 5A, the grey entries 51 indicate tasks (tiles) that have completed their processing, and for which a respective bit is therefore set (e.g. to '1') to indicate this, whereas the white entries 52 indicate tasks (tiles) that have not yet completed their processing (and for which the respective bit is therefore cleared (e.g. '0').

Figure 5B:
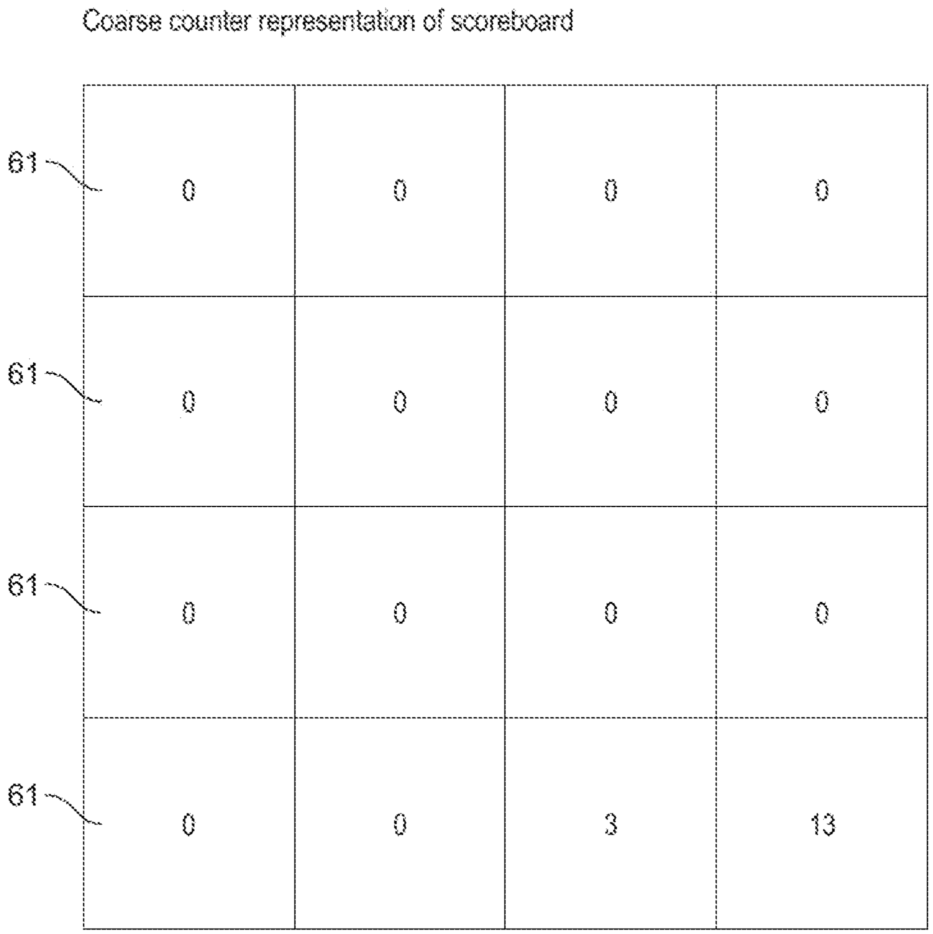
FIG. 5B shows a 'task completion status' data structure that may be used to track the completion status of rendering tasks for an associated rendering job according to a second example.

In FIG. 5A, the 'task completion status' data structure 50 thus comprises a bit array that indicates for each rendering task (tile) to be performed for the rendering job with which the 'task completion status' data structure 50 is associated whether or not the rendering task (tile) has completed its processing. A respective 'task completion status' data structure 50 for a rendering job can thus be allocated within the fragment task iterator 20 at the start of the rendering job, and then suitably initialised. For example, any entries within the 'task completion status' data structure 50 corresponding to tasks (tiles) which reside outside of the region to which the rendering job will write to can be initially set (e.g.) to '1' to effectively indicate that those tasks (tiles) have completed their processing (since there is no processing to be done, and so there can be no data (processing) dependencies on those tasks (tiles)), whereas all other entries are cleared (e.g.) to '0' when the 'task completion status' data structure 50 is allocated, with those entries thus being updated (and set) appropriately as the corresponding rendering tasks complete. FIG. 5B shows an embodiment of a relatively coarser 'task completion status' data structure that may be used to track the completion status of rendering tasks for an associated rendering job, illustrating the same amount of completion in the example shown in FIG. 5A, but wherein rather than storing indicators for individual rendering tasks, the 'task completion status' data structure instead indicates for groups of rendering tasks (tiles) whether or not the group of rendering tasks (tiles) as a whole has completed its processing. Thus, each entry 61 in the 'task completion status' data structure in FIG. 5B represents a corresponding group of rendering tasks (tiles) (in this example 16 but in general the tracking may be performed at any suitable and desired granularity).

In FIG. 5B, rather than storing a (binary) indicator as to whether the group has completed its processing, it is instead tracked for each group of rendering tasks (tiles) how many of the rendering tasks (tiles) within the group of rendering tasks (tiles) are still being processed. In this case, the reference counts that are stored within the 'task completion status' data structure may be initialised, on allocation of the data structure, to zero. Then, as rendering tasks are issued, the respective entries will have their reference count incremented. As the rendering tasks complete their processing, the respective reference counters are accordingly decremented and once the counter for a respective group of rendering tasks (tiles) returns to zero, this indicates that the group of rendering tasks (tiles) has completed its processing. Thus, in the present example, as depicted in FIG. 5B, most of the group of rendering tasks (tiles) have completed their processing, as the respective counters have been decremented to zero. However, (and as shown in FIG. 5A which shows the tracking of the individual rendering tasks) there are still rendering tasks within the final two groups of rendering tasks that have not completed their processing and so the counters for those groups are non-zero.

Various other arrangements would of course be possible for tracking the completion status of rendering tasks, or groups thereof.

The 'task completion status' data structure, in whatever form it takes, can then be used accordingly to control the processing of rendering tasks (tiles) for the next frame to enforce any required data (processing) dependencies between rendering tasks. For instance, FIG. 6 shows an example of a so-called 'read-after-write' dependency between two render passes, where the later render pass (RenderPass2) needs to read data from render targets (ImageA and ImageB) that are written to be the earlier render pass (RenderPass1).

In this situation, the rendering tasks for any rendering jobs for the later render pass (RenderPass2) that read from these render targets (images) should therefore not be processed until the processing of the corresponding rendering tasks for the earlier render pass (RenderPass1) is complete, i.e. so that the relevant portions of the render targets (images) have been written accordingly by the rendering jobs for earlier render pass prior to any rendering jobs for the later render pass reading those portions.

Figure 6:
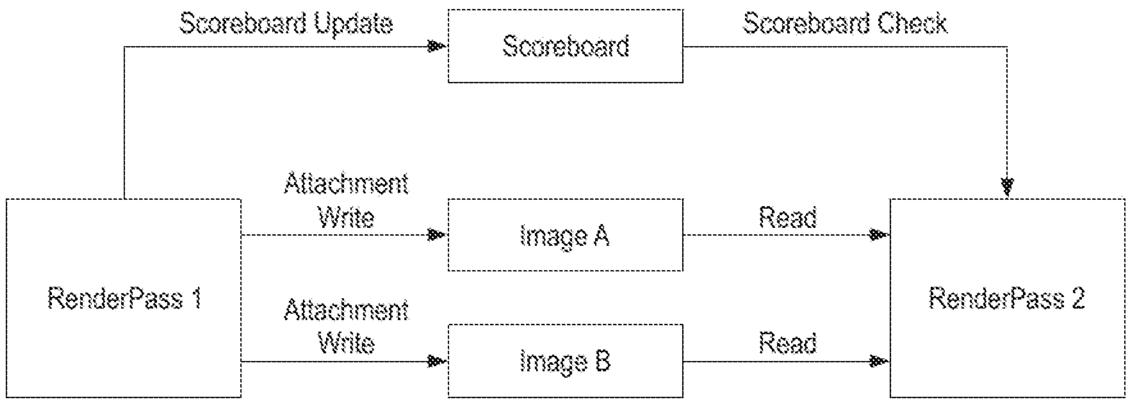
FIG. 6 shows an example of a so-called 'read-after-write' dependency between two render passes.

As shown in FIG. 6, the 'task completion status' data structure ("scoreboard") is thus updated as and when the rendering tasks for the rendering job for the earlier render pass complete. The rendering job for the later render pass is thus operable and configured to check the scoreboard appropriately prior to performing the required read operations to check whether or not the relevant rendering tasks have completed their processing. If not, the rendering tasks for the rendering job for the later render pass may be stalled until the required data is available (i.e. until the corresponding rendering task for the rendering job for the first render pass has completed its processing and the scoreboard updated accordingly to reflect this).

Figure 7:
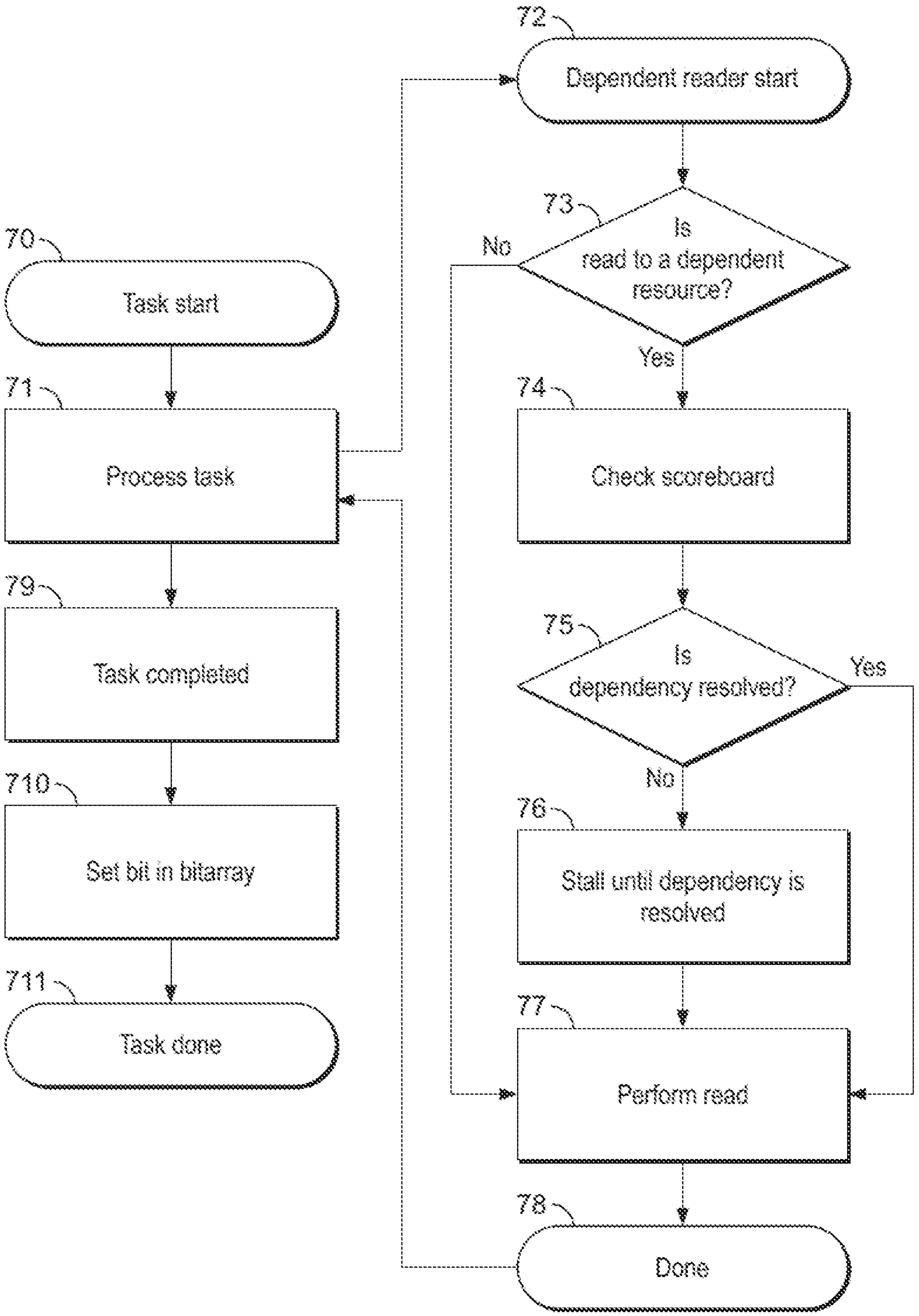
FIG. 7 is a flow chart illustrating how such data dependencies can be controlled according to embodiments.

FIG. 7 is a flow chart illustrating how such data dependencies can be controlled using the scoreboard according to the present embodiments. In particular, FIG. 7 shows the processing of a particular rendering task within a given rendering job for a particular render pass. Thus, the rendering task may be scheduled for processing by the task iterator 20 (at step 70), and the processing of the rendering task begun (step 71). At some point during the processing of the rendering task, it may be identified that there is a potential data dependency that needs to be checked before performing a read operation, and so a dependent reader routine is started (step 72), as follows.

Firstly, it is checked whether the read is to a dependent resource (step 73). If not (step 73-no), i.e. there is no data dependency, the read can then be performed immediately (step 77), and this is done, thus allowing the task to progress further.

On the other hand, if it is identified that is a potential data dependency, i.e. the read is to a dependent resource (step 73-yes), the scoreboard for the earlier rendering job on which the processing potentially depends is then checked (step 74) to see whether the dependency is released. If it can be determined that the dependency is resolved (step 75-yes), i.e. because the scoreboard check (at step 74) indicates that the corresponding rendering task for the earlier rendering job has already completed, the read can then be performed (step 77), and this is done, as described above.

However, if it cannot be determined that the dependency is resolved (step 75-no), i.e. because the scoreboard check (at step 74) indicates that the corresponding rendering task for the earlier rendering job has not completed its processing, the read cannot be performed, and so the read is stalled until it can be determined that the dependency is resolved (step 76). In this case, when the corresponding rendering task for the earlier rendering job complete, the associated scoreboard for the earlier render pass will be updated, such that the dependency is resolved, and at some point the stall will be released, so that the read can be performed (step 77), and so the task can progress further.

It will be appreciated that a single rendering task may spawn many execution threads which execute a multitude of shader programs and each thread may perform multiple reads. Each of these memory accesses may need to perform a dependency check as described above (i.e. in steps 73 to 77). Once all of the threads for the rendering task have completed their processing (step 78), the processing of the rendering task can be completed (step 79), with the tile outputs being written to memory, and an appropriate update being performed to the respective scoreboard for the rendering job to indicate that the task has completed its processing (step 710). The rendering task is then done (step 711).

Figure 8A:
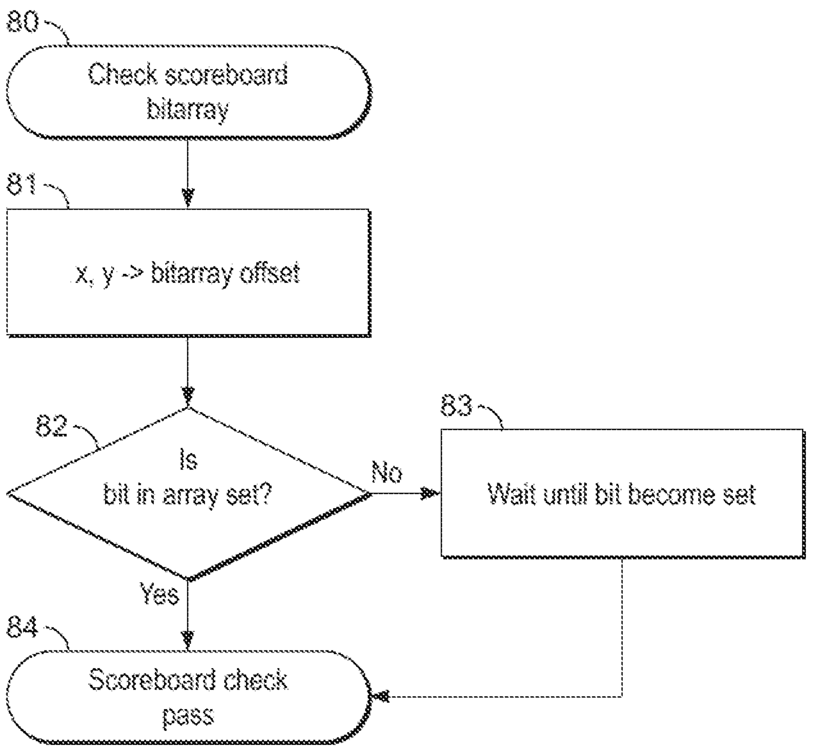
FIG. 8A illustrates the use of the 'task completion status' data structure according to FIG. 5A.

FIG. 8A illustrates the checking of the scoreboard (i.e. at step 74) according to FIG. 5A. In this example, when it is needed to check the scoreboard bit array in respect of a rendering task (step 80, corresponding to step 74 in FIG. 7), it is then identified which position in the scoreboard for the earlier rendering job corresponds to the rendering task on which the current rendering task potentially depends (step 81) (e.g. by working out which bit in the bit array corresponds to the position of the rendering tile to which the rendering task relates).

If the bit is not set, indicating that the corresponding rendering task for the earlier render pass has not yet completed its processing (step 82-no), this means that it cannot be determined that the dependency has resolved, and so the read should stall. Thus, the processing waits until the scoreboard is updated (step 83) and the scoreboard check can be passed (step 84). Whereas, if the bit is set, indicating that the corresponding rendering task for the earlier render pass has completed its processing, it is determined on this basis that the dependency has resolved, and the scoreboard check can be passed (step 84).

Figure 8B:
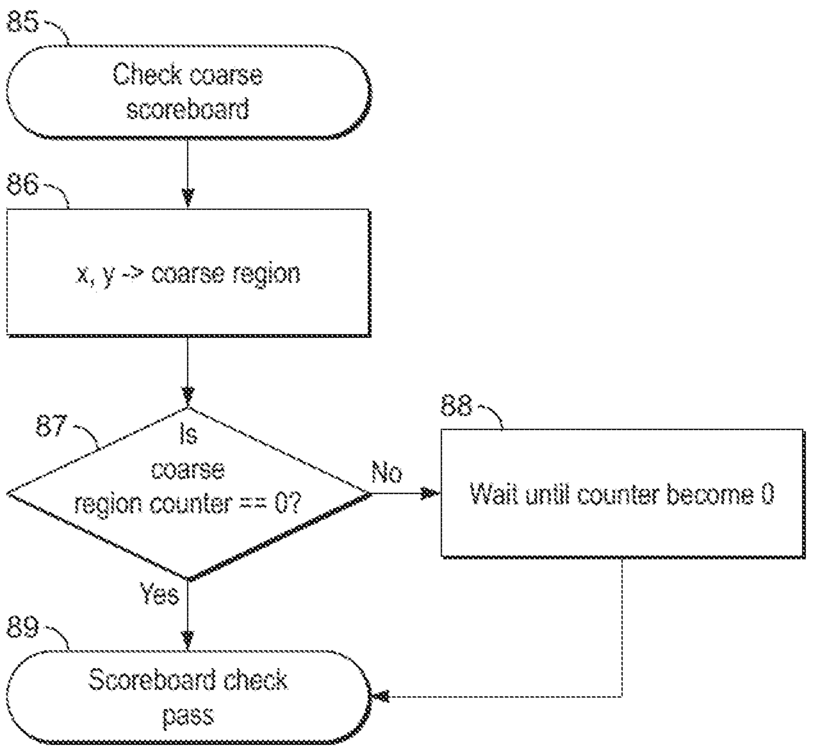
FIG. 8B illustrates the use of the 'task completion status' data structure according to FIG. 5B.

FIG. 8B shows a corresponding checking of the scoreboard according to FIG. 5B. In this case, when it is needed to check the scoreboard (step 85), it is identified which region in the scoreboard for the earlier pass includes the rendering task on which the current rendering task potentially depends (step 86). If the counter for that region has decremented to zero (step 87-yes), indicating that the corresponding rendering task for the earlier render pass has completed its processing, it is determined on this basis that the dependency has resolved, and the scoreboard check can be passed (step 89). On the other hand, if the counter for that region is not equal to zero (step 87-no), indicating that there are at least some rendering tasks in that region that have not completed, a wait is implemented (step 88) until the scoreboard is updated.

Various other arrangements would be possible, e.g. depending on the configuration of the scoreboard.

Figure 9:
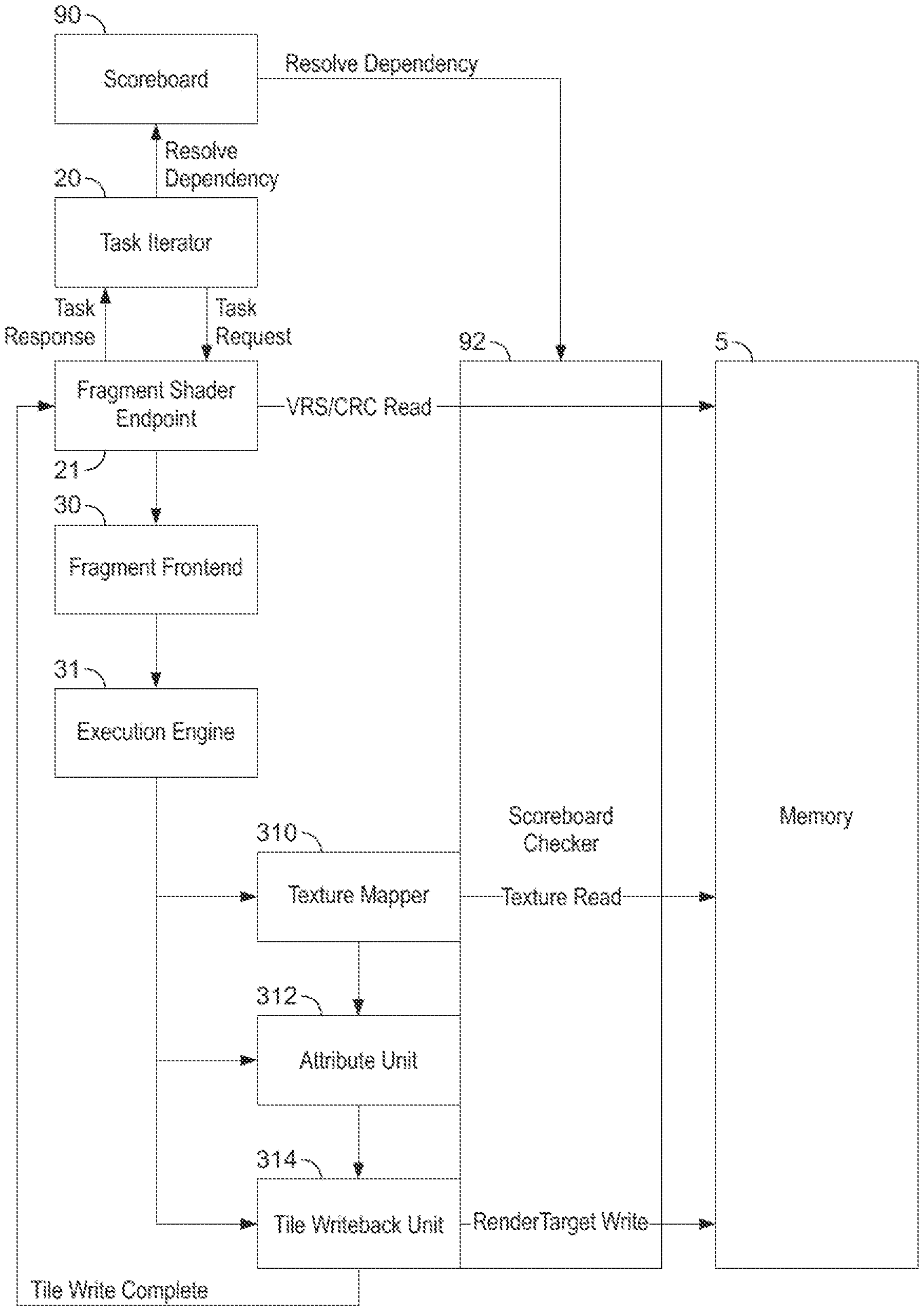
FIG. 9 illustrates the operation of a graphics processor according to an embodiment.

In this way, it is possible to control the processing of rendering task within the shader cores in order to enforce data dependencies. That is, rather than strictly enforcing processing barriers between rendering jobs within the job manager circuit (a command stream frontend circuit) 35, it is possible to move the dependency management between rendering jobs into the graphics processor hardware, with the dependencies being checked at the point at which a memory access is required. This is illustrated in FIG. 9. FIG. 9 thus illustrates the operation of a graphics processor according to an embodiment.

As shown in FIG. 9, and as described above, the task iterator 20 controls the scheduling and issuing of tasks to the shader cores for processing, via the fragment shader endpoint 21. The fragment shader endpoint 21 for a shader core then issues rendering tasks for processing by the graphics processing pipeline that is being implemented by the respective shader core, e.g. by first executing the fragment frontend processing 30, and then passing any surviving fragments to the execution engine 31 for execution of the required fragment shader programs. The fragment shader program then performs the desired rendering.

There are various points within the graphics processing pipeline where memory access may be required and where the memory access may potentially require access to a data buffer that is written by an earlier rendering job. According to the present embodiments, as described above, the scoreboard 90 can thus be (and is) used whenever such memory accesses are required in order to enforce any potential data dependencies between rendering jobs.

For example, as shown in FIG. 9, the fragment shader endpoint 21 may need to read in from memory 5 certain state information or parameters such as variable rate shading parameters, or tile signatures for transaction elimination, e.g. in the form of a CRC buffer. However, these parameters may in turn be generated by an earlier rendering job (e.g. within a previous render pass). Thus, the fragment shader endpoint 21, prior to reading in any such parameters, is operable and configured to check the scoreboard 90 to see if any potential data dependencies exist, and if so, check whether they are resolved. (This can then be done as described above using the dependent reader operation shown in FIG. 7.)

Similarly, the execution engine 31 when executing a shader program may at various points during shader program execution require memory access. For instance, an example of this would be when the rendering task requires a texture to be read in via the texture mapper unit 310 of the execution engine 31. However, again, the required texture may have been generated by an earlier rendering job within a previous render pass, e.g. as a “render to texture” output. Accordingly, the texture mapper unit 310 may perform the texture read via a suitable scoreboard checker 92 that is operable to and configured to check whether or not the dependency is resolved.

A similar situation occurs for reads through the attribute unit 312 which can again be performed via the scoreboard checker 92, in the same manner as described above.

When the rendering task is completed, the tile writeback unit 314 can then write the output (render target) accordingly to the memory 5. This is then signalled appropriately to the fragment shader endpoint 21 which in turn can signal this information to the scoreboard 90 to cause an appropriate update of the scoreboard 90 associated with the current rendering job.

Thus, as shown in FIG. 9, the fragment shader endpoint 21 in an embodiment triggers and controls updating of the scoreboard 90 for the current rendering job. Then, during the processing of the current rendering job, the scoreboard checker 92 within the shader core is operable and configured to check, as necessary, the corresponding scoreboard 90 for an earlier rendering job to ensure any data dependencies are resolved prior to performing any memory access to a potentially dependent resource.

FIG. 6 above shows an example of a so-called 'read-after-write' dependency between two render passes, which 'read-after-write' dependency can be handled as described above.

Figure 10:
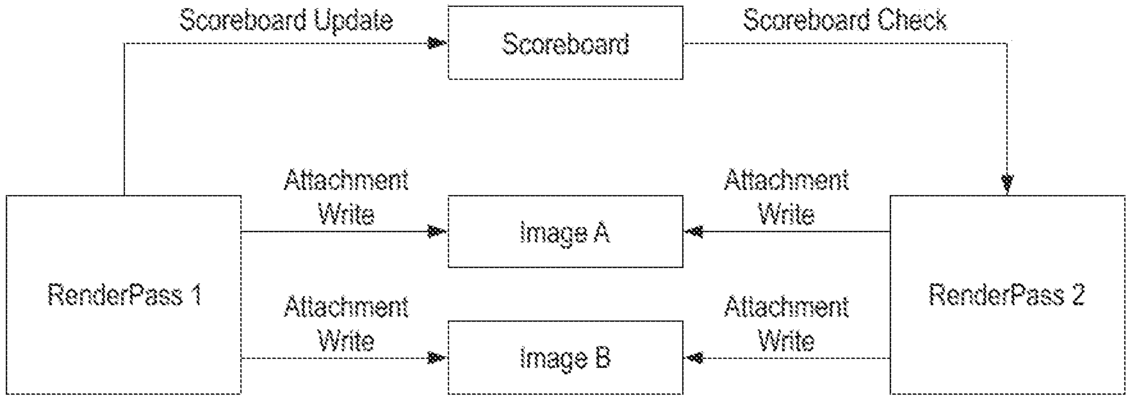
FIG. 10 shows an example of a so-called 'write-after-write' dependency between two render passes.

FIG. 10 shows an example of a so-called 'write-after-write' dependency between two render passes, where the later render pass overwrites a render target (image) that is also written to by the earlier render pass. These dependencies can generally be handled similarly to the 'read-after-write' dependencies illustrated in FIG. 6, using the techniques described above.

However, it will be appreciated that there may be other situations, or types of dependencies, that cannot be handled in this way.

Figure 11:
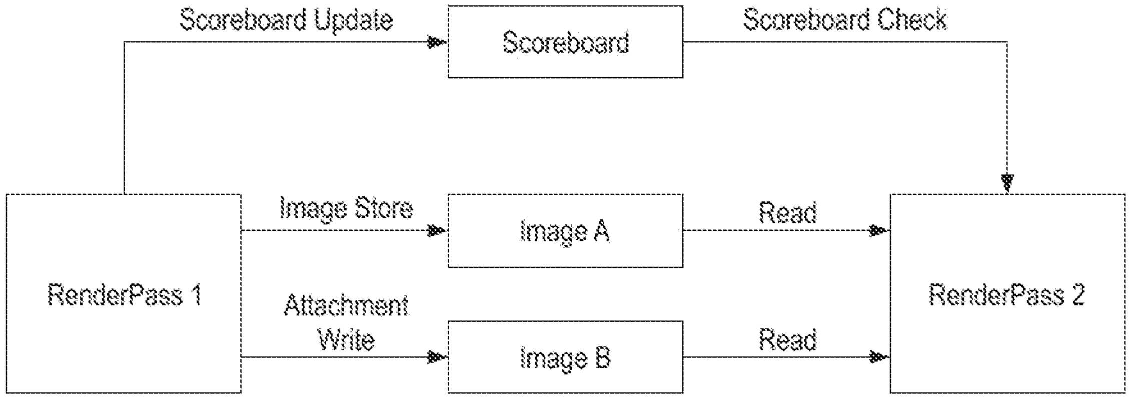
FIG. 11 shows an example of a shader side effect that may be present within a render pass.

An example where the job manager circuit (a command stream frontend circuit) 35 may need to enforce a hard processing barrier may be where a render pass includes 'side effects'. An example of this is shown in FIG. 11 where the earlier render pass performs an 'Image Store' operation for a render target (ImageA) that is to be read by the later render pass. This Image Store operation may be present within any arbitrary one of the rendering tasks for the earlier render pass, and this may not be known in advance, and so it is not generally safe to start processing the later render pass in this situation until all of the rendering tasks for the earlier render pass have completed.

Another example of this might be a 'write-after-read' dependency where a rendering job for a later render pass may write to a render target (image) that a rendering job for an earlier render pass potentially needs to read from. In that case, the read operations may generally be unconstrained such that a read may be performed as part of any one of the rendering tasks for the rendering job for the earlier render pass. In that case, it may be not be safe to start issuing any rendering tasks for the later render pass, and a hard processing barrier may therefore be enforced by the job manager circuit (a command stream frontend circuit) 35.

Various other examples would be possible.

In general, a rendering task in a later rendering job may depend on any of the rendering tasks for an earlier rendering job. Thus, when performing a dependency check, it may be necessary to first determine which rendering tasks are causing potential dependencies, and an appropriate lookup to the entries of the respective 'task completion status' data structure for the earlier rendering job can then be performed to check whether or not the dependency is active.

Figure 12:
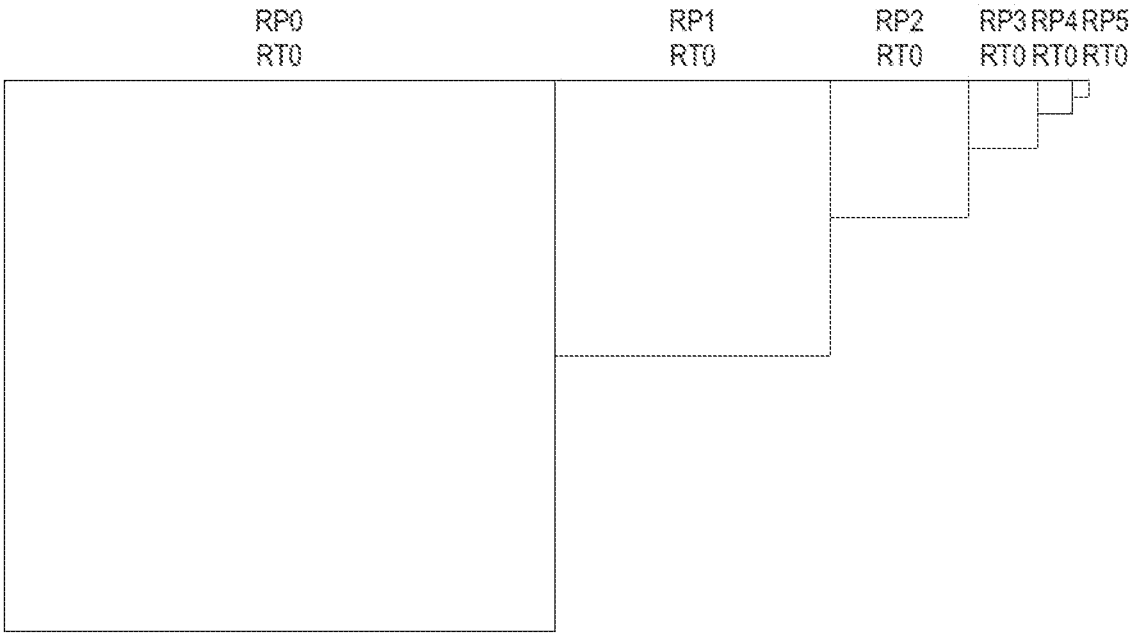
FIG. 12 shows an example of a "mipmap" generating sequence that may be performed within a graphics processor.

In some cases, however, it may be known in advance, e.g. since it is predefined (in hardware), that a rendering task for a later rendering job will only depend on the equivalent rendering task for the previous rendering job. An example of this would be when generating a sequence of "mipmaps". FIG. 12 shows an example of a "mipmap" generating sequence that may be performed within a graphics processor. In the example shown in FIG. 12, there are six rendering jobs (RP0-RP5), each writing to a respective render target (RT0-RT5), wherein each rendering job generates a 2×2 downscaled version of the render output from the previous rendering job.

In this example each rendering job generates a respective "mipmap".

Figure 13:
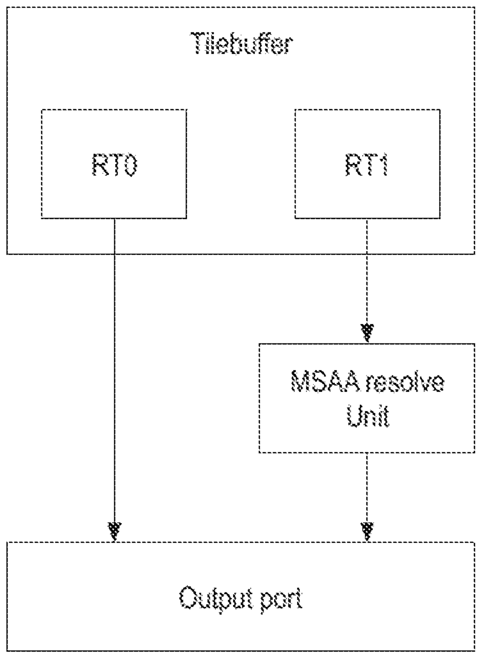
FIG. 13 shows schematically the writeback stage of the graphics processor according to an example when 4xMSAA is used.
Figure 14:
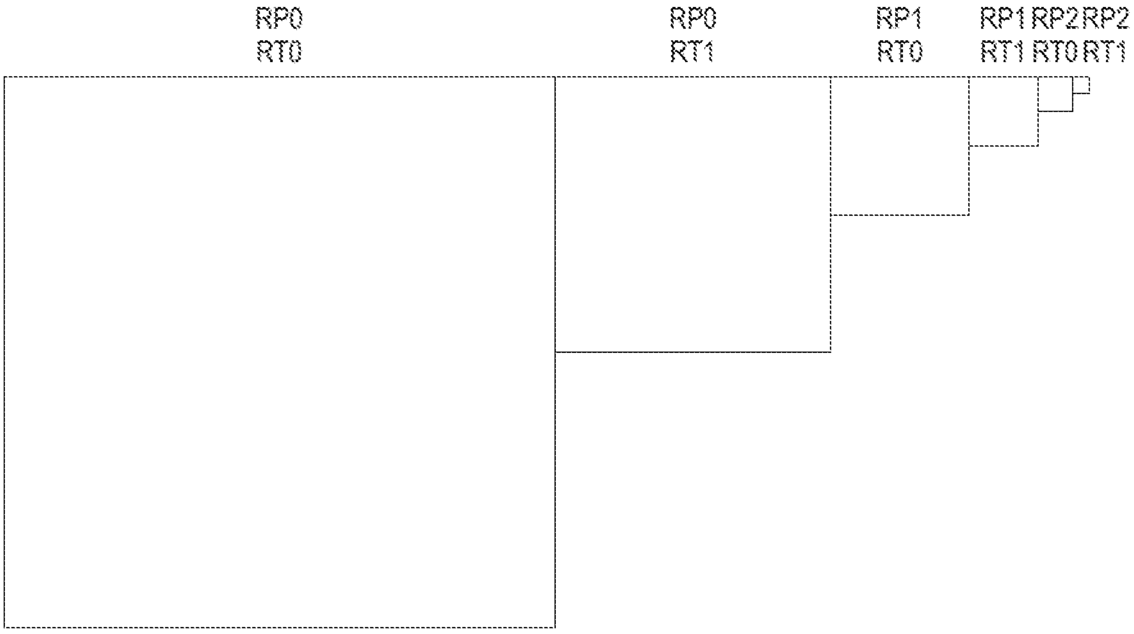
FIG. 14 shows another example of a "mipmap" generating sequence that may be performed within a graphics processor wherein two mipmaps are generated by each render pass.

However, it is also possible for a given rendering job to produce two "mipmaps". For example, FIG. 13 shows a write out stage in a graphics processor that is configured to produce two mipmaps at the same time. In this case, each rendering job produces two render targets: one with 4xMSAA being applied; the other with the MSAA disabled. FIG. 14 shows the corresponding sequence of rendering jobs in this case where now there are only three rendering jobs (RP0-RP2), which produce the same six mipmaps as shown in FIG. 12.

Figure 15:
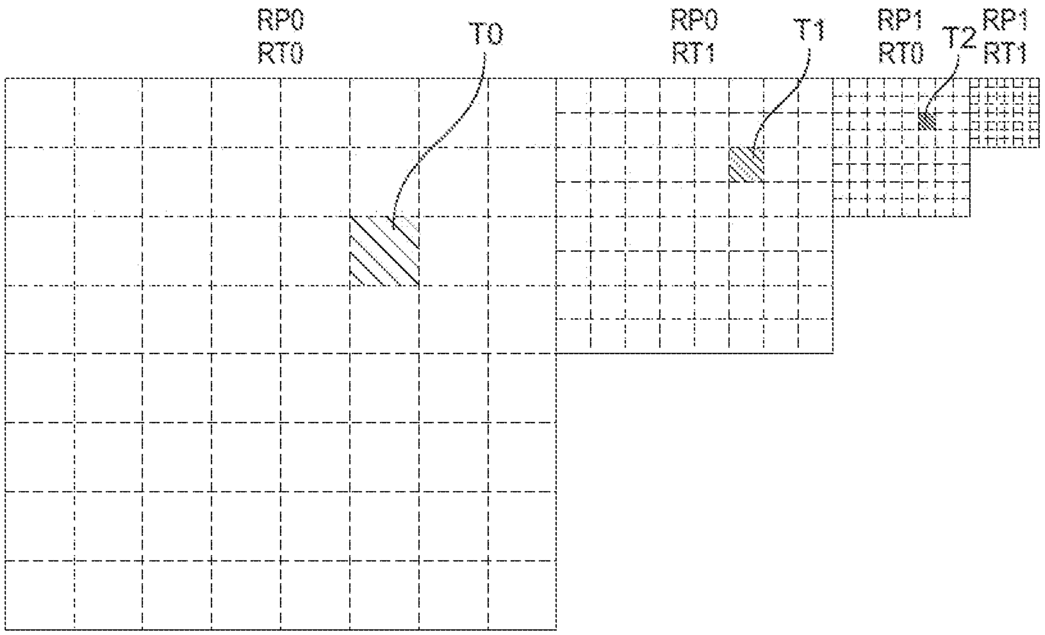
FIG. 15 illustrates data dependencies that may exist within such a "mipmap" generating sequence.

In this case, there is a read-after-write dependency between rendering jobs in relation to the rendering tiles that correspond to the same region of the render output, as shown in FIG. 15. In particular, in this example, the rendering tile T2 that is processed during the second rendering job (RP1) has a dependency on the rendering tile T1, which is produced when during the first rendering job (RP0). As mentioned above, in relation to FIG. 14, the rendering tile T1 is not actually processed, but the output in this region is instead produced during the write out stage at the same time as the rendering tile TO which is processed during the first rendering job (RP0). Thus, the 'task completion status' will generally be tracked for the rendering tiles that are actually processed, i.e. for RP0, RT0, but this will therefore also track the 'task completion status' for the second render target, i.e. RP0, RT1, that is produced by the same processing.

Figure 16:
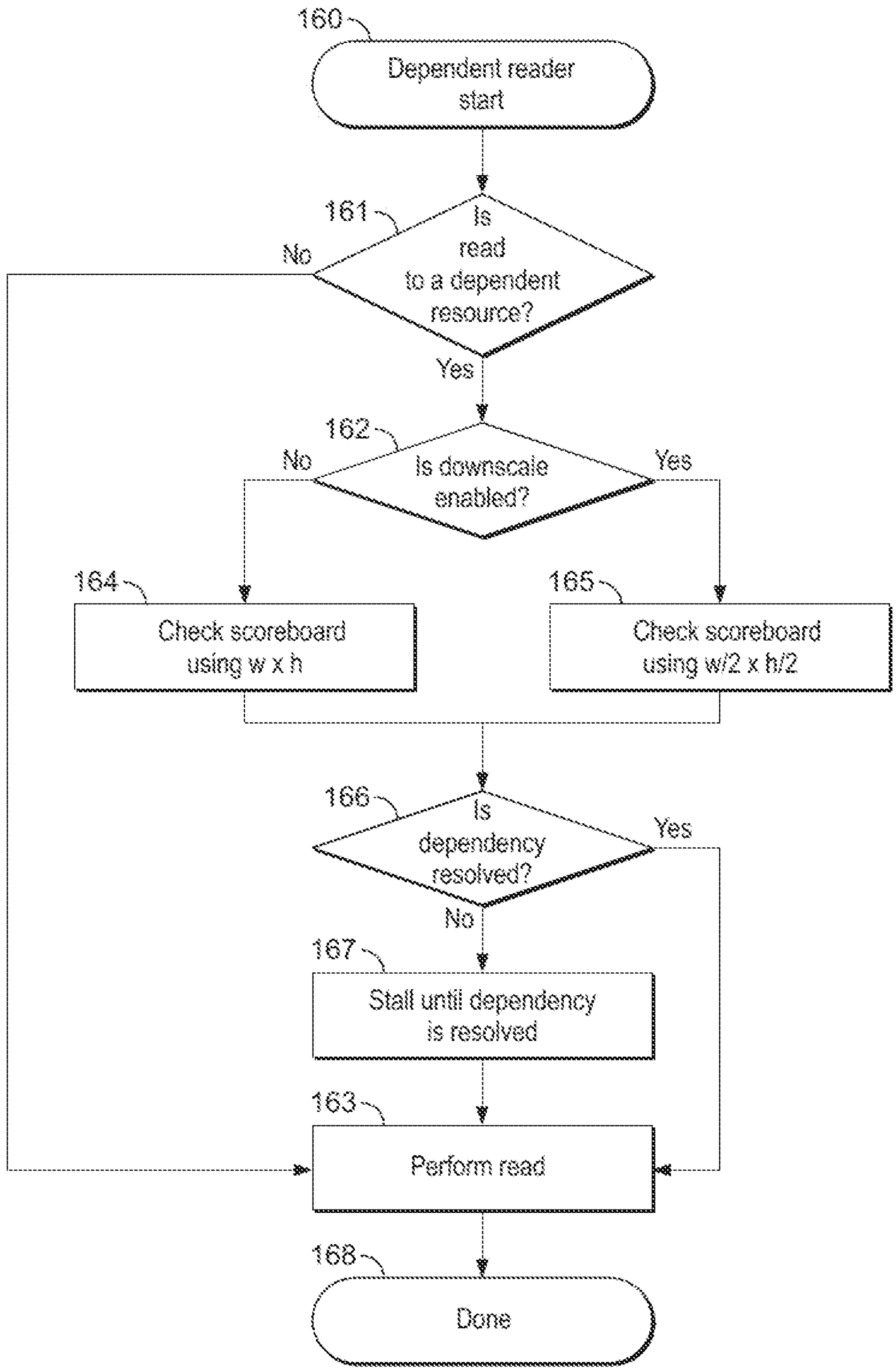
FIG. 16 is a flow chart illustrating how such data dependencies can be controlled when generating a series of "mipmaps".

When the rendering tile T2 is issued for processing, it is thus necessary to determine whether the rendering tile T1 has completed its processing. However, because the resolution has changed between the two rendering jobs, the lookup to the 'task completion status' data structure for the earlier rendering job (RP0) should take this change in resolution into account. This can be done in various ways. For example, as shown in FIG. 16, in the present embodiments, the 'task completion status' data structure for the earlier rendering job (RP0) may be generated as above, i.e. based on and at the resolution of the rendering tasks that are processed to produce the first render output (RP0, RT0). The addressing logic when performing a lookup during the later rendering job (RP1) may however then be modified so that the 'task completion status' data structure is checked at the desired resolution. Thus, rather than using the addressing logic for the 'task completion status' data structure based on the resolution of the rendering tiles for the earlier rendering job (RP0), the lookup is instead performed at the resolution of the rendering tiles for the later rendering job (RP1), i.e. at a downscaled 2×2 resolution.

FIG. 16 thus illustrates how such data dependencies can be controlled when generating a series of "mipmaps".

In particular, when processing of a particular rendering task within a given rendering job, at some point during the processing of the rendering task, it may be identified that there is a potential data dependency that needs to be checked before performing a read operation, and so a dependent reader routine is started (step 160) (similarly as described above).

It is then checked whether the read operation relates to a dependent resource (step 161). If not, the read can be performed (and is-step 163), as there is no dependency (step 161-no). On the other hand, if the read operation does relate to a dependent resource (step 161-yes), it is then checked whether or not the sequence of rendering jobs that is being performed is a "mipmap" generating sequence, in particular by checking whether a 'downscale' mode has been enabled (step 162). If not (step 162-no), the 'task completion status' data structure is checked, as normal, using the full resolution of the 'task completion status' data structure (step 164) (i.e. using the actual width and height coordinates). Otherwise, when the downscale mode is enabled (step 162-yes), the addressing logic is modified, as described above, so that the 'task completion status' data structure is checked using suitably downscaled coordinates (i.e. width/2 and height/2) (step 165).

Either way, if the dependency is resolved (step 166), the read can then be performed (step 163). Otherwise, the rendering task for the later rendering job is stalled until the dependency has resolved (step 167). Once all potential reads have been checked in this way, the dependent reader routine is then done (step 168).

Various other arrangements would be possible.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of operating a graphics processor when performing a sequence of rendering jobs, wherein each rendering job in the sequence of rendering jobs comprises a respective set of rendering tasks to be processed to produce a respective one or more render output(s) for the rendering job, the method comprising:

when performing a certain sequence of rendering jobs that produces a series of progressively lower resolution versions of the same render output in which there is a change in resolution between the render outputs produced by different rendering jobs in the sequence of rendering jobs:

issuing rendering tasks for a second, later rendering job in the sequence of rendering jobs for processing concurrently with rendering tasks for a first, earlier rendering job in the sequence of rendering jobs; and when a rendering task for the second, later rendering job is to be processed the processing of the rendering task for the second, later rendering job depending on processing of a rendering task for the first, earlier rendering job:

controlling at least some processing of the rendering task for the second, later rendering job based on determining whether the rendering task for the first, earlier rendering job on which the at least some processing of the rendering task for the second, later rendering job depends has completed its processing, wherein the determining whether the rendering task for the first, earlier rendering job on which the at least some processing of the rendering task for the second, later rendering job depends has completed its processing comprises looking up a corresponding entry for the rendering task in a respective 'task completion status' data structure associated with the first, earlier rendering job, the 'task completion status' data structure associated with the first, earlier rendering job containing a plurality of entries each capable of storing for a respective set of one or more rendering tasks for the first, earlier rendering job a respective indicator as to whether the set of one or more rendering tasks has completed its processing, and wherein the looking up the corresponding entry for the rendering task in the 'task completion status' data structure for the first, earlier rendering job takes into account the change in resolution between the first, earlier rendering job and the second, later rendering job, wherein when looking up the corresponding entry for the rendering task in the 'task completion status' data structure for the first, earlier rendering job, addressing logic for a lookup is modified to take into account the change in resolution between the first, earlier rendering job and the second, later rendering job.

2. The method of claim 1, wherein when looking up the corresponding entry for the rendering task in the 'task completion status' data structure for the first, earlier rendering job the 'task completion status' data structure associated with the first, earlier rendering job is downscaled to take into account the change in resolution between the first, earlier rendering job and the second, later rendering job.

3. The method of claim 1, wherein the certain sequence is a sequence of rendering jobs for generating a series of mipmaps, in which there is a predefined power-of-2 change in resolution between mipmaps.

4. The method of claim 3, wherein each rendering job in the sequence of rendering jobs produces two mipmaps.

5. The method of claim 1, comprising the graphics processor identifying when it is performing a certain sequence of rendering jobs that produces a series of progressively lower resolution versions of the same render output in which there is a change in resolution between the render outputs produced by different rendering jobs in the sequence of rendering jobs, and when it is identified that the graphics processor is performing such a sequence of rendering jobs, performing the looking up to take into account the change in resolution between the rendering jobs.

6. The method of claim 1, wherein once the graphics processor has finished performing a final rendering job certain sequence of rendering jobs that produces a series of progressively lower resolution versions of the same render output in which there is a change in resolution between the render outputs produced by different rendering jobs in the sequence of rendering jobs, a strict processing barrier is then enforced between the final rendering job and a further rendering job to be performed.

7. A computer program product containing instructions that when executed by a data processor will cause the data processor to perform a method of operating a graphics processor as claimed in claim 1.

8. A graphics processor comprising:

a set of one or more processing cores; and a control circuit configured to:

when performing a certain sequence of rendering jobs that produces a series of progressively lower resolution versions of the same render output in which there is a change in resolution between the render outputs produced by different rendering jobs in the sequence of rendering jobs:

cause a task issuing circuit of the graphics processor to: issue rendering tasks for a second, later rendering job in the sequence of rendering jobs for processing concurrently with rendering tasks for a first, earlier rendering job in the sequence of rendering jobs; and the control circuit further configured to:

when a rendering task for the second, later rendering job is to be processed, the processing of the rendering task for the second, later rendering job depending on processing of a rendering task for the first, earlier rendering job:

control at least some processing of the rendering task for the second, later rendering job based on determining whether the rendering task for the first, earlier rendering job on which the at least some processing of the rendering task for the second, later rendering job depends has completed its processing, wherein the determining whether the rendering task for the first, earlier rendering job on which the at least some processing of the rendering task for the second, later rendering job depends has completed its processing comprises looking up a corresponding entry for the rendering task in a respective 'task completion status' data structure associated with the first, earlier rendering job, the 'task completion status' data structure associated with the first, earlier rendering job containing a plurality of entries each capable of storing for a respective set of one or more rendering tasks for the first, earlier rendering job a respective indicator as to whether the set of one or more rendering tasks has completed its processing, and wherein the looking up the corresponding entry for the rendering task in the 'task completion status' data structure for the first, earlier rendering job takes into account the change in resolution between the first, earlier rendering job and the second, later rendering job, (i) wherein when looking up the corresponding entry for the rendering task in the 'task completion status' data structure for the first, earlier rendering job the 'task completion status' data structure associated with the first, earlier rendering job is downscaled to take into account the change in resolution between the first, earlier rendering job and the second, later rendering job; and/or (ii) wherein when looking up the corresponding entry for the rendering task in the 'task completion status' data structure for the first, earlier rendering job, addressing logic for a lookup is modified to take into account the change in resolution between the first, earlier rendering job and the second, later rendering job.

9. The graphics processor of claim 8, wherein the certain sequence is a sequence of rendering jobs for generating a series of mipmaps, in which there is a predefined power-of-2 change in resolution between mipmaps.

10. The graphics processor of claim 9, wherein the graphics processor is configured so that each rendering job in the sequence of rendering jobs produces two mipmaps.

11. The graphics processor of claim 8, wherein the graphics processor is configured to identify when it is performing a certain sequence of rendering jobs that produces a series of progressively lower resolution versions of the same render output in which there is a change in resolution between the render outputs produced by different rendering jobs in the sequence of rendering jobs, and when the graphics processor identifies that it is performing such a sequence of rendering jobs, the control circuit is configured to perform the looking up to take into account the change in resolution between the rendering jobs.

12. The graphics processor of claim 8, wherein once the graphics processor has finished performing a final rendering job certain sequence of rendering jobs that produces a series of progressively lower resolution versions of the same render output in which there is a change in resolution between the render outputs produced by different rendering jobs in the sequence of rendering jobs, the control circuit is configured to then enforce a strict processing barrier between the final rendering job and any further rendering jobs to be performed.

13. A method of operating a graphics processor when performing a sequence of rendering jobs, wherein each rendering job in the sequence of rendering jobs comprises a respective set of rendering tasks to be processed to produce a respective one or more render output(s) for the rendering job, the method comprising:

when performing a certain sequence of rendering jobs that produces a series of progressively lower resolution versions of the same render output in which there is a change in resolution between the render outputs produced by different rendering jobs in the sequence of rendering jobs:

issuing rendering tasks for a second, later rendering job in the sequence of rendering jobs for processing concurrently with rendering tasks for a first, earlier rendering job in the sequence of rendering jobs; and when a rendering task for the second, later rendering job is to be processed the processing of the rendering task for the second, later rendering job depending on processing of a rendering task for the first, earlier rendering job:

controlling at least some processing of the rendering task for the second, later rendering job based on determining whether the rendering task for the first, earlier rendering job on which the at least some processing of the rendering task for the second, later rendering job depends has completed its processing, wherein the determining whether the rendering task for the first, earlier rendering job on which the at least some processing of the rendering task for the second, later rendering job depends has completed its processing comprises looking up a corresponding entry for the rendering task in a respective 'task completion status' data structure associated with the first, earlier rendering job, the 'task completion status' data structure associated with the first, earlier rendering job containing a plurality of entries each capable of storing for a respective set of one or more rendering tasks for the first, earlier rendering job a respective indicator as to whether the set of one or more rendering tasks has completed its processing, and wherein the looking up the corresponding entry for the rendering task in the 'task completion status' data structure for the first, earlier rendering job takes into account the change in resolution between the first, earlier rendering job and the second, later rendering job, wherein when looking up the corresponding entry for the rendering task in the 'task completion status' data structure for the first, earlier rendering job the 'task completion status' data structure associated with the first, earlier rendering job is downscaled to take into account the change in resolution between the first, earlier rendering job and the second, later rendering job.

14. The method of claim 13, wherein the certain sequence is a sequence of rendering jobs for generating a series of mipmaps, in which there is a predefined power-of-2 change in resolution between mipmaps.

15. The method of claim 13, comprising the graphics processor identifying when it is performing a certain sequence of rendering jobs that produces a series of progressively lower resolution versions of the same render output in which there is a change in resolution between the render outputs produced by different rendering jobs in the sequence of rendering jobs, and when it is identified that the graphics processor is performing such a sequence of rendering jobs, performing the looking up to take into account the change in resolution between the rendering jobs.

16. The method of claim 13, wherein once the graphics processor has finished performing a final rendering job certain sequence of rendering jobs that produces a series of progressively lower resolution versions of the same render output in which there is a change in resolution between the render outputs produced by different rendering jobs in the sequence of rendering jobs, a strict processing barrier is then enforced between the final rendering job and a further rendering job to be performed.

17. A computer program product containing instructions that when executed by a data processor will cause the data processor to perform a method of operating a graphics processor as claimed in claim 13.

* * * * *